United States Patent
Roberts et al.

(10) Patent No.: US 11,348,096 B2
(45) Date of Patent: May 31, 2022

(54) RECONCILIATION FOR ENABLING ACCESS TO TRANSFERRING CONTRIBUTION FUNDED ACCOUNTS

(71) Applicant: ConnectYourCare, LLC, Hunt Valley, MD (US)

(72) Inventors: David Roberts, Cockeysville, MD (US); Melissa Stirling, Reisterstown, MD (US); Peter Mazur, Lutherville, MD (US); Jennifer Frankenfield, Mount Juliet, TN (US); Bryan Schrock, Baltimore, MD (US); Vrajesh Bhavsar, Franklin, TN (US); Jennifer Levy, Manchester, MD (US); Brian Strom, Baltimore, MD (US); Dan Stachura, Parkton, MD (US)

(73) Assignee: CONNECTYOURCARE, LLC, Hunt Valley, MD (US)

( * ) Notice: Subject to any disclaimer, the term of this patent is extended or adjusted under 35 U.S.C. 154(b) by 291 days.

(21) Appl. No.: 15/887,757

(22) Filed: Feb. 2, 2018

(65) Prior Publication Data

US 2018/0174135 A1 Jun. 21, 2018

Related U.S. Application Data

(63) Continuation-in-part of application No. 15/651,645, filed on Jul. 17, 2017, now Pat. No. 10,032,217, (Continued)

(51) Int. Cl.
*G06Q 20/36* (2012.01)
*G06Q 20/34* (2012.01)
*G06Q 20/32* (2012.01)

(52) U.S. Cl.
CPC ......... *G06Q 20/367* (2013.01); *G06Q 20/325* (2013.01); *G06Q 20/34* (2013.01)

(58) Field of Classification Search
CPC ...... G06Q 40/00; G06Q 40/02; G06Q 20/367; G06Q 20/3676; G06Q 20/325; G06Q 20/34; G06Q 20/04
See application file for complete search history.

(56) References Cited

U.S. PATENT DOCUMENTS

| 6,108,641 A * | 8/2000 | Kenna ................. G06Q 20/405 705/35 |
| 7,174,302 B2 | 2/2007 | Patricelli et al. |

(Continued)

FOREIGN PATENT DOCUMENTS

WO  WO2016/145183 A1  9/2016

OTHER PUBLICATIONS

Non-Final Office Action directed to related U.S. Appl. No. 15/651,645, dated Oct. 20, 2017; 22 pages.

(Continued)

*Primary Examiner* — Namrata Boveja
*Assistant Examiner* — Carol A See
(74) *Attorney, Agent, or Firm* — Sterne, Kessler, Goldstein & Fox P.L.L.C.

(57) ABSTRACT

Disclosed herein are system, method, and computer program product embodiments for reconciliation needed to enable access to accelerated contribution funded accounts (CFAs). An embodiment operates by configuring a management database to store a linked CFA associated with a CFA and an asset-transfer on demand account (ATODA). A transfer processing system of a provider may receive a transfer file from an employer. The transfer processing system may delay transfer reconciliation of the linked CFA until a transferred amount is received. During transfer reconciliation, the transfer processing system may resolve the ATODA using the received transferred amount. Upon resolution of the ATODA, the contribution processing system may concur- (Continued)

rently send information to a bank server and a card server to reconcile the respective bank and card accounts with the linked CFA at the provider.

20 Claims, 16 Drawing Sheets

Related U.S. Application Data which is a continuation of application No. PCT/US2015/021752, filed on Mar. 10, 2016.

(60) Provisional application No. 62/131,057, filed on Mar. 10, 2015.

(56) References Cited

U.S. PATENT DOCUMENTS

| | | | |
|---|---|---|---|
| 7,529,700 B1 * | 5/2009 | Kessler | G06Q 40/02 705/2 |
| 10,032,217 B2 | 7/2018 | Roberts et al. | |
| 2002/0003552 A1 | 1/2002 | Tooke, III | |
| 2002/0035529 A1 | 3/2002 | Tooke, III | |
| 2002/0147678 A1 | 10/2002 | Drunsic | |
| 2006/0212378 A1 * | 9/2006 | Hoffman | G06Q 40/02 705/35 |
| 2008/0191008 A1 | 8/2008 | Manfredi et al. | |
| 2012/0054088 A1 | 3/2012 | Edrington et al. | |
| 2013/0144783 A1 | 6/2013 | Bishop | |
| 2014/0006050 A1 | 1/2014 | Feinschreiber et al. | |
| 2015/0127367 A1 | 5/2015 | Sexton et al. | |
| 2017/0316498 A1 | 11/2017 | Roberts et al. | |
| 2018/0322570 A1 | 11/2018 | Levy et al. | |

OTHER PUBLICATIONS

Notice of Allowance directed to related U.S. Appl. No. 15/651,645, dated May 21, 2018; 9 pages.
International Search Report and Written Opinion of the International Searching Authority directed to related International Patent Application No. PCT/US2016/021752, dated Jun. 16, 2016; 8 pages.
U.S. Appl. No. 16/039,188 "Reconciliation for Enabling Accelerated Access to Contribution Funded Accounts" Roberts et al. filed Jul. 18, 2018.
Non-Final Office Action directed to U.S. Appl. No. 15/651,645, dated Oct. 20, 2017; 23 pages.
Notice of Allowance directed to U.S. Appl. No. 15/651,645, dated May 21, 2018; 11 pages.
International Search Report and Written Opinion of the International Searching Authority directed to related International Patent Application No. PCT/US2016/021752, dated Jun. 16, 2016; 14 pages.
International Preliminary Report on Patentability of the International Searching Authority directed to related International Patent Application No. PCT/US2016/021752, dated Jun. 16, 2016; 7 pages.
Declaration of Melissa Stirling relating to U.S. Pat. No. 10,032,217, filed in Supplemental Examination Control U.S. Appl. No. 96/000,321 on Apr. 9, 2020; 12 pages.
Supplemental Declaration of Melissa Stirling and associated exhibits relating to U.S. Pat. No. 10,032,217, filed in Supplemental Examination Control U.S. Appl. No. 96/000,321 on Nov. 2, 2020; 52 pages.
Office Action in Supplemental Examination Control U.S. Appl. No. 96/000,321, dated Aug. 31, 2020; 43 pages.
Response to Office Action in Ex Parte Reexamination, filed in Supplemental Examination Control U.S. Appl. No. 96/000,321 dated Nov. 2, 2020; 85 pages.
Declaration of Dr. Jules White, filed in U.S. Appl. No. 15/651,645 on Jan. 22, 2018; 7 pages.
Unpublished Supplemental Examination U.S. Appl. No. 96/000,321, filed Apr. 9, 2020; 40 pages.
Final Office Action in Supplemental Examination Control U.S. Appl. No. 96/000,321, dated Jan. 25, 2021; 54 pages.

* cited by examiner

RECONCILIATION FOR ENABLING ACCESS TO TRANSFERRING CONTRIBUTION FUNDED ACCOUNTS

CROSS-REFERENCE TO RELATED APPLICATIONS

This application is a continuation-in-part of U.S. patent application Ser. No. 15/651,645, filed Jul. 17, 2017, which is a continuation of PCT Application No. PCT/US2016/021752, filed Mar. 10, 2016, which in turn claims the benefit of U.S. Provisional Patent Application No. 62/131,057, filed Mar. 10, 2015, both of which are incorporated by reference herein in their entireties.

BACKGROUND

Contribution funded accounts (CFAs) may be tax-advantaged financial accounts that may be set up through, for example, a cafeteria plan provided by an employer. A cafeteria plan is a reimbursement plan that allows employees to contribute, pre-tax, some of their total income to a designated account. The selected plan may allow an employee to contribute a portion of his pre-tax earnings at the end of each pay period to fund the CFA. The funds within the CFA may be used to pay for qualified expenses as established in the cafeteria plan.

The plan is typically a year-long plan that may be updated and/or annually renewed. As the plan year progresses and contributions from each pay period are added to the CFA, an employee may gain access to an increasing amount of tax-advantaged funds to pay for qualified expenses. However, an employee typically only has access to funds currently stored in the CFA. Therefore, especially towards the beginning of the plan year when funds in the CFA are just starting to accumulate, an employee may not have adequate funds in the CFA to pay for large qualified expenses.

To enable accelerated access to CFAs, a plan manager may provide a linked CFA that links a CFA with a CFA On Demand (CFAOD). The CFAOD may contain funds that reflect future contributions that have yet to be used to fund the CFA. By enabling an employee accelerated access to future contributions, the employee may more likely be able to pay for large qualified expenses starting from the first day of the plan year.

In order to manage a CFA, a plan manager may typically need to manage and reconcile CFAs stored in databases across multiple entities including the employer, bank, and card vendor, plan manager, sponsor, and distributor. With the introduction of the new account type, the CFAOD, new reconciliation processes may be required to manage the CFAs in the databases of the multiple entities. These new reconciliation processes may further introduce synchronization latencies across the multiple entities that may need to be minimized to enable an employee full and uninterrupted access to accelerated CFAs.

Further, when CFAs transfer between holding entities, a blackout period typically occurs between the time that one entity closes the existing CFA and sends the CFA assets to a second entity and the time that the second entity receives the CFA assets and funds the new CFA. This blackout period could leave the employee without access to funds if a need event arises. Further, the blackout period may discourage employees from transferring their CFA to a more appropriately suited entity because the employee may be concerned about availability of access.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
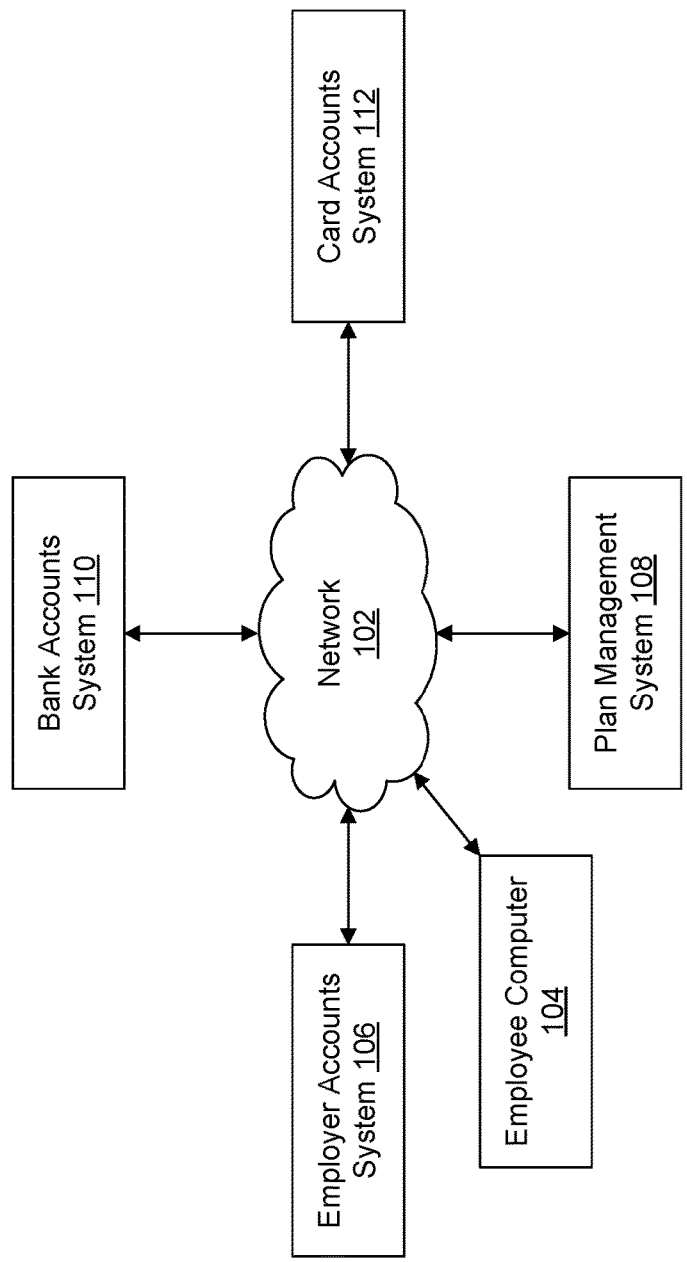
FIG. 1 is an example block diagram illustrating the multiple systems of respective entities involved in providing and maintaining accelerated access to contribution funded accounts, according to an example embodiment.

Provided herein are system, method and/or computer program product embodiments, and/or combinations and sub-combinations thereof, for efficient and latency-minimized reconciliation of accelerated access enabling contribution funded accounts (CFAs) stored in databases across multiple entities including the employer, the bank, and the card vendor. In an embodiment, reconciliation processes may be adjusted to process an employee's enrollment into a CFA plan, an employee's contribution, an employee's claims, and an employee's termination of the CFA plan and/or from his employer.

A CFA may be any tax-advantaged financial account that is set up by an employee through, for example, a cafeteria plan of an employer. While the present application will use a cafeteria plan as an example, one of skill in the art would recognize that other types of employee benefit plans may alternatively or additionally be provided by the employer. The cafeteria plan selected by the employee may allow an employee to contribute a portion of his pre-tax earnings at the end of each pay period to fund the CFA. The funds within the CFA may be used to pay for qualified expenses as established in the cafeteria plan. For example, CFAs may include flexible spending accounts (FSAs), such as health FSAs, dependent care FSAs, limited expense FSAs, adoption related FSAs, among other types of FSAs. A CFA may additionally include non-FSAs such as health savings accounts (HSAs) and other contributions based tax-advantaged accounts.

To enable accelerated access a plan manager may provide a linked CFA that links various sub-accounts. For example, a CFA may be linked to a CFA On Demand (CFAOD). In an embodiment, the CFA may itself be comprised of two sub-accounts: an employer funded CFA and/or an employee funded CFA. In an embodiment, the CFAOD may be initialized with a sum of contributions to be made in a plan year, while the CFA may contain a zeroed balance. In an embodiment, the CFA may contain a preexisting balance from the previous plan year. As contribution amounts from each pay period are added to the CFA, the same contribution amounts are deducted from the CFAOD to maintain total available funds within the linked CFA including the CFA and the CFAOD. Therefore, a contribution from a pay period effectively transfers the specified contribution amount from the CFAOD to the CFA. By enabling an employee accelerated access to future contributions stored within the CFAOD, the employee may more likely be able to pay for larger qualified expenses starting from the first day of the plan year.

Further, an Asset Transfer on Demand (ATOD) process bridges the gap that occurs when moving CFA funds from one bank to another. This applies to any CFA where a transfer of assets is possible, such as, for example, Health Savings Accounts (HSA), and occasionally for other types of assets such as Health Reimbursement Arrangements (HRA), Retiree Medical Accounts (RMA) and other asset based plans where a bank holds employee balances. ATOD grants an employer the ability to allow usage of the funds during the transition and reduces the impact to the employee (also referred to herein as the participating member) by collecting the funds after the transition.

CFA On Demand

FIG. 1 illustrates a linked CFA system 100 for providing and maintaining accelerated access to CFAs across multiple entities including an employer, an employee, a bank, a card vendor, and a plan manager, according to an embodiment. Linked CFA system 100 includes network 102, employee computer 104 operated by the employee, employer accounts system 106 of the employer, plan management system 108 of the plan manager, bank accounts system 110 of the bank, and card accounts system 112 of the card vendor. Each of the systems and/or computer may be implemented using one or more processors. Although the systems are depicted as remote systems connected via network 102 in CFA system 100, one or more systems may be operated by and/or maintained by one entity. For example, bank accounts system 110 and card accounts system 112 may be part of a single system operated by one entity.

Network 102 may enable plan management system 108 to communicate with and reconcile CFAs stored at the multiple systems: employer accounts system 106, bank accounts system 110, and card accounts system 112. In an embodiment, employee computer 104 may communicate with and view CFA information stored on any of the depicted systems. In an embodiment, employer computer 104 may access a portal provided by plan management system 108 that acts as an interface for viewing CFA information stored on any of the depicted systems. Network 102 may be an enterprise wide area network (WAN) utilizing Ethernet communications, although other wired and/or wireless communication techniques, protocols and technologies may be used.

Figure 2:
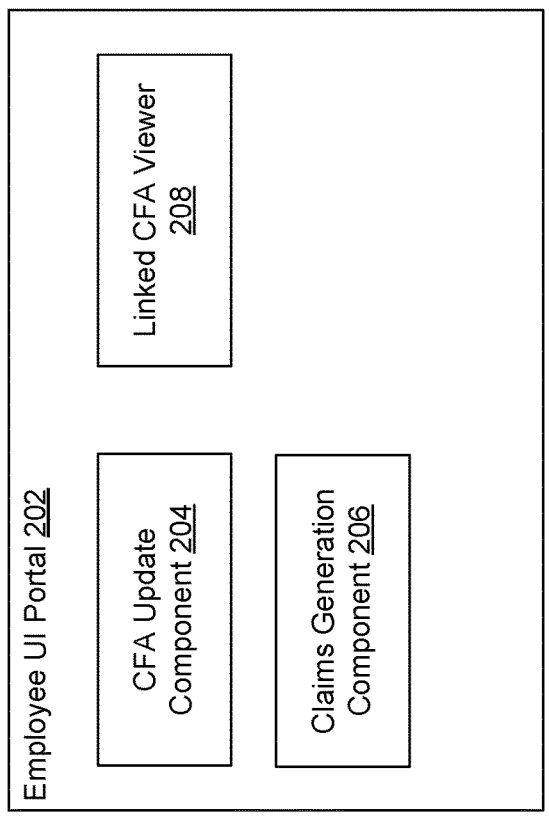
FIG. 2 is an example block diagram illustrating the components within an employee user interface portal for providing an employee access to his contribution funded account, according to an example embodiment.

FIG. 2 illustrates exemplary components within an employee user interface (UI) portal 202 that employee computer 104 may access via network 102, according to an example embodiment. In an embodiment, employee user UI portal 202 is accessible to the employee via a mobile device operated by the employee. Employee UI portal 202 may enable the employee to access his linked CFA managed by plan management system 108. In the exemplary embodiment of FIG. 2, employee UI portal 202 may include CFA update component 204, claims generation component 206, and CFA viewer 208. In an embodiment, each of CFA update component 204, claims generation component 206, and CFA viewer 208 may be accessible via respective panes on a homepage of employee UI portal 202 and/or via a menu toolbar of employee UI portal 202.

CFA update component 204 may be configured to enable an employee operating employee computer 104 to update information related to maintaining his CFAs. In an embodiment, CFA update component 204 may be operated by the employee to elect a particular cafeteria plan to set up a CFA for a plan year. The cafeteria plan may include a traditional CFA as well as a linked CFA comprising a CFA linked to a CFAOD. Employee UI portal 202 may send the election results to employer account system 106 to set up, for example, the linked CFA. In an embodiment, depending on restrictions established by an employer and/or the cafeteria plan, the employee may make adjustments to the cafeteria plan throughout the plan year via CFA update component 204. Other capabilities CFA update component 204 may provide include allowing the employee to invest funds in his linked CFA, to manually contribute and/or transfer funds to the linked CFA, and/or to terminate his cafeteria plan.

Claims generation component 206 may be configured to enable an employee operating employee computer 104 to enter claims to be paid and/or reimbursed using funds within the linked CFA. The employee may manually enter a claim having service information and a claim amount. The service information may include, for example, a service type, a date of the service, and an entity providing the service. The entered claims may additionally be required to include a proof of service such as a receipt used to verify the service and the claim amount. In an embodiment, claims generation component 206 may be configured to provide a pre-generated claims request template according to the CFA plan. For a linked CFA associated with a health related plan, claims generation component 206 may, for example, pre-generate templates for various services and items covered by the health plan.

Linked CFA viewer 208 may be configured to enable an employee operating employee computer 104 to view current statuses and balances of sub-accounts within the linked CFA. In an embodiment, the employee may be able to track transactions and respective statuses for each sub-account. Statuses may include those known to one skilled in the art, such as SETTLED if a transaction has been processed or PENDING if the transaction is undergoing processing. In an embodiment the SETTLED status may further include or instead be a PAID status to indicate a transaction was successfully processed or INELIGIBLE if the transaction could not be processed i.e. denied. The PENDING status may be associated with a transaction under review or in the process of being reimbursed.

In an embodiment, linked CFA viewer 208 may enable the employee to view an overall balance of the linked CFA, but also balances of the sub-accounts such as the CFAOD. Linked CFA viewer 208 may also allow the employee to see transactions and associated claims made against each of the sub-accounts. For example, if a contribution amount is made at the end of a pay period, a transaction crediting a CFA of a linked CFA by the contribution amount may be displayed, as well as a transaction debiting a CFAOD of the linked CFA by the same contribution amount. Therefore, the total fund within the linked CFA remains unchanged before and after the contribution. In another example, if a claim is made against the linked CFA, a transaction debiting the CFA may be displayed. If funds from the CFA were insufficient, a transaction debiting the CFAOD by an amount needed to completely service the claim may also be displayed.

Figure 3:
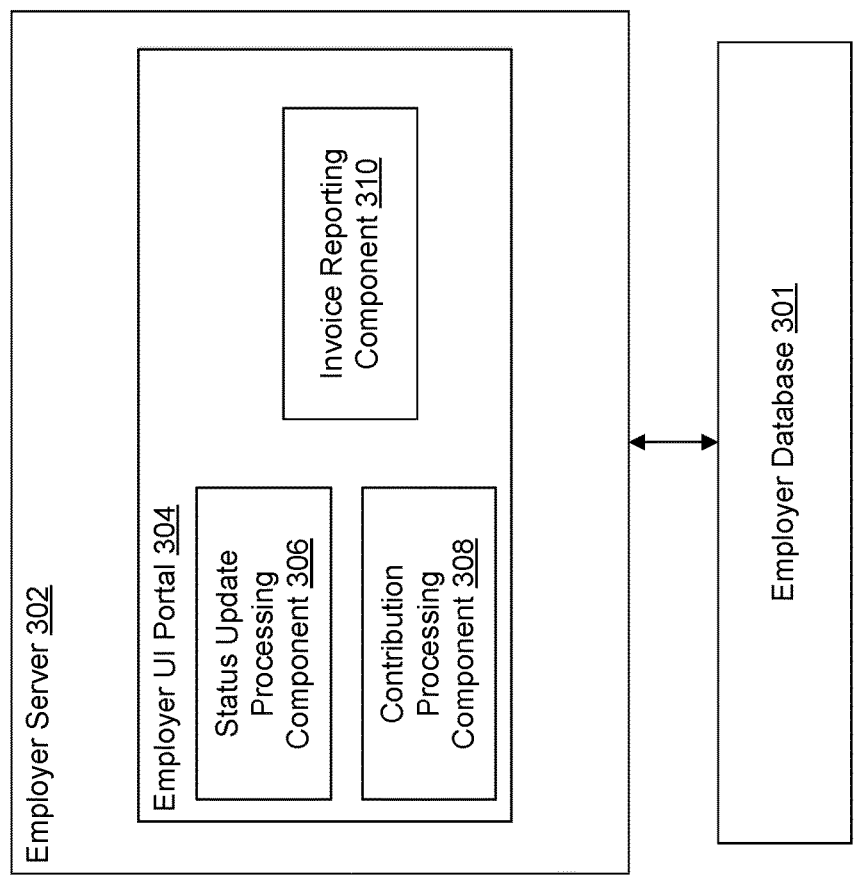
FIG. 3 is an example block diagram illustrating the components within an employer accounts system for interacting with an accounts management system for tracking employees' linked contribution funded accounts, according to an example embodiment.

FIG. 3 illustrates employer accounts system 300 maintained by an employer for interacting with plan management system 400 to track its employees' linked CFAs, according to an exemplary embodiment of employer accounts system 106. Employer accounts system 300 may include employer server 302 and employer database 301. Though depicted as a single server, employer server 302 may be representative of a plurality of servers, each of which may be implemented by one or more processors. Likewise, employer database 301 may be representative of a plurality of databases coupled to a plurality of employer servers.

Employer database 301 may be configured to store employee information, employer plan offerings, and employee selections of plan offerings. Employee information may include various information such as census information, salaries, and employment statuses. Employer plan offerings may include, for example, a traditional CFA, such as an HSA, or a linked CFA containing a CFA linked to a CFAOD. Employee selections may include information associated with an employee's election of an employer plan offering for a plan year, employees' elected contributions to fund CFAs, as well as whether CFA funds are being invested. In an embodiment, employer database 301 may also store account information of CFAs (including linked CFAs) and associated transaction logs. Transaction logs may, for example, track contributions and claims made on the linked CFAs.

Employer server 302 may instantiate employer user interface (UI) portal 304. Portal 304 may include status update processing component 306, contribution processing component 308, and invoice reporting component 310. One or more of these depicted components may be implemented as processing systems comprising one or more sub-components. These sub-components may include an interface for communicating within and/or across systems and a distribution component for sending information to other components and/or across systems. For example, contribution processing component 308 may be implemented as a contribution processing system including an interface for receiving information and a distribution component for sending information.

Generally, employer UI portal 304 may be configured to allow an employer, particularly benefits administrators of the employer, to manually adjust and/or input employee statuses, employer offerings, and contribution proportions of employee income and associated amounts through the use of various components as will be discussed. The adjustments may be performed by the various components and sent to plan management system 108 to update linked CFAs managed at the plan management system 108. In an embodiment, employer UI portal 304 may be configured to allow an employer to view details of employee CFA/CFAODs such as CFA/CFAOD statuses, CFA/CFAOD balances, and transactions related to contributions to CFAs.

In an embodiment, employer UI portal 304 may only adjust and view employer or employee contributions as specified by an employer benefits plan. Other contributions, such as contributions that are outside of the employer benefits plan and made by an employee through employee UI portal 202 may not be viewable. In addition to viewing details, employer UI portal 304 may be configured to provide analytics and report generation capabilities.

Status update processing component 306 within employer UI portal 304 may be configured to enable an employer to input information related to an employee's selected employer plan offering. For example, status update processing component 306 may enable an employer to input information to adjust an employee's enrollment within a linked CFA near the end of each plan year. Accordingly, status update processing component 306 may send update information to plan management system 108 that manages and updates the linked CFAs. In an embodiment, information for updating the linked CFA may include information indicating enrollment of a new or existing employee into a linked CFA in accordance with an employee elected employer benefits plan. For enrollment, status update processing component 306 may additionally be configured to send census and eligibility information of the employee, which may be retrieved from employer database 301.

To set up traditional CFAs, update information may include employee census/eligibility information and information about one or both of employee and employer funded account types tied to a specific plan year. The plan management system 108 may then set up a CFA using the designated account(s). But to set up a linked CFA enabling accelerated access to CFA funds, update information may additionally include information about a third account type, the CFAOD. The CFAOD, which may be linked to a traditional CFA, provides the accelerated funds to the employee. In an embodiment, status update processing component 306 may send a message associating an employee with his elected employer benefit plan. In an embodiment, various employee or employer selected restrictions or options may also be included in the update information. For example, employee restrictions/options may include a proportion of his income (or the actual contribution amount) to fund the linked CFA at the end of every pay period. An employer may specify a maximum total contribution amount for an employee in a plan year for one or more of the sub-account making up the linked CFA. The employer may also cap a maximum amount of an employee's future pledged contributions to be made available to the employee for advancement. At the time of contribution, any eligible contribution amount will then be effectively decreased from the CFAOD and added to the CFA. Upon receiving the set-up information/message, plan management system 108 may set up a linked CFA enabling an employee immediate and accelerated access to future contributions to use for an expense immediately before the future contribution is applied.

In an example scenario, an employee may elect to contribute $100 for 12 months totaling $1200 available for advancement on the first day of the plan year. But, the employer may limit the maximum amount an employee may contribute to the linked CFA in the plan year to $1000. The cap amount may depend on a combination of employee information, employer benefit plan type, and government regulations. The employer may also limit, for example, the total future contributions to be made available for advancement to $800. In this scenario, the employee may only gain accelerated access to $800 of his linked CFA on the first day of the plan year, as opposed to the $1000 designated by the total contribution limit.

Contribution processing component 308 may be configured to process and manage an employee's contributions to his one or more linked CFAs per pay period. First, based on employee enrollment and update information stored in employer database 301, contribution processing component 308 may generate a contributions file specifying a proportion of every employee's income (or alternatively an actual contribution amount) for a pay period. In an embodiment, the contribution file may only contain contribution information of select employees, e.g. employees enrolled in one or more linked CFAs or CFAs. Accordingly, the generated contributions file may be sent to plan management system 400 for each pay period.

Contribution processing component 308 may then receive a contributions funding request (CFR) from plan management system 400 specifying a proportion of the contribution amounts specified in the sent contributions file that must be transmitted from employer accounts system 300 to plan management system 400. The actual contribution amounts to be transmitted may not match the amounts in the contributions file for any number of reasons. For example, plan management system 400 may determine, for an employee, that he does not exist in the plan management system 400, he has not enrolled in a linked CFA, his linked CFA account has not been enabled or is terminated, or his designated contribution amount exceeds a specified maximum amount. In these cases, the employee's contribution amount will not be included in the CFR. Invoice reporting component 310 may be configured to periodically receive and report invoices generated by plan management system 108. In an embodiment, invoice reporting component 310 may receive an employer weekly funding request (EWFR) detailing payback records and billing records for employees enrolled in at least one linked CFA or traditional CFA. In an embodiment, the employer funding request may be sent bi-weekly or quarterly, etc., and not necessarily on a weekly basis.

A billing record for an associated employee may indicate that a portion of the employee's funds in a CFAOD has been withdrawn (or borrowed) to service a claim because the funds within the employee's CFA was not sufficient. In this scenario, the employer may need to reimburse the provider the withdrawn portion. A payback record of an associated employee may indicate that a portion of an employee's previous contribution(s) was used to repay funds previously withdrawn from the CFAOD to service a claim. In summary, an employer may be billed for any amount borrowed from an employee's CFAOD. Accordingly, the employer may need to be paid back any amount used to repay an amount previously borrowed from the CFAOD. Relatedly, in an embodiment, only claims that require funding from the CFAOD may be invoiced. The invoice may then be received and reported by invoice reporting component 310.

In an embodiment, the EWFR may also include contribution records and claims records for the employees on a weekly basis. These records may be associated with payback and billing records, respectively. In an embodiment, payback records and billing records may be represented and transmitted in a transactional format.

Figure 4:
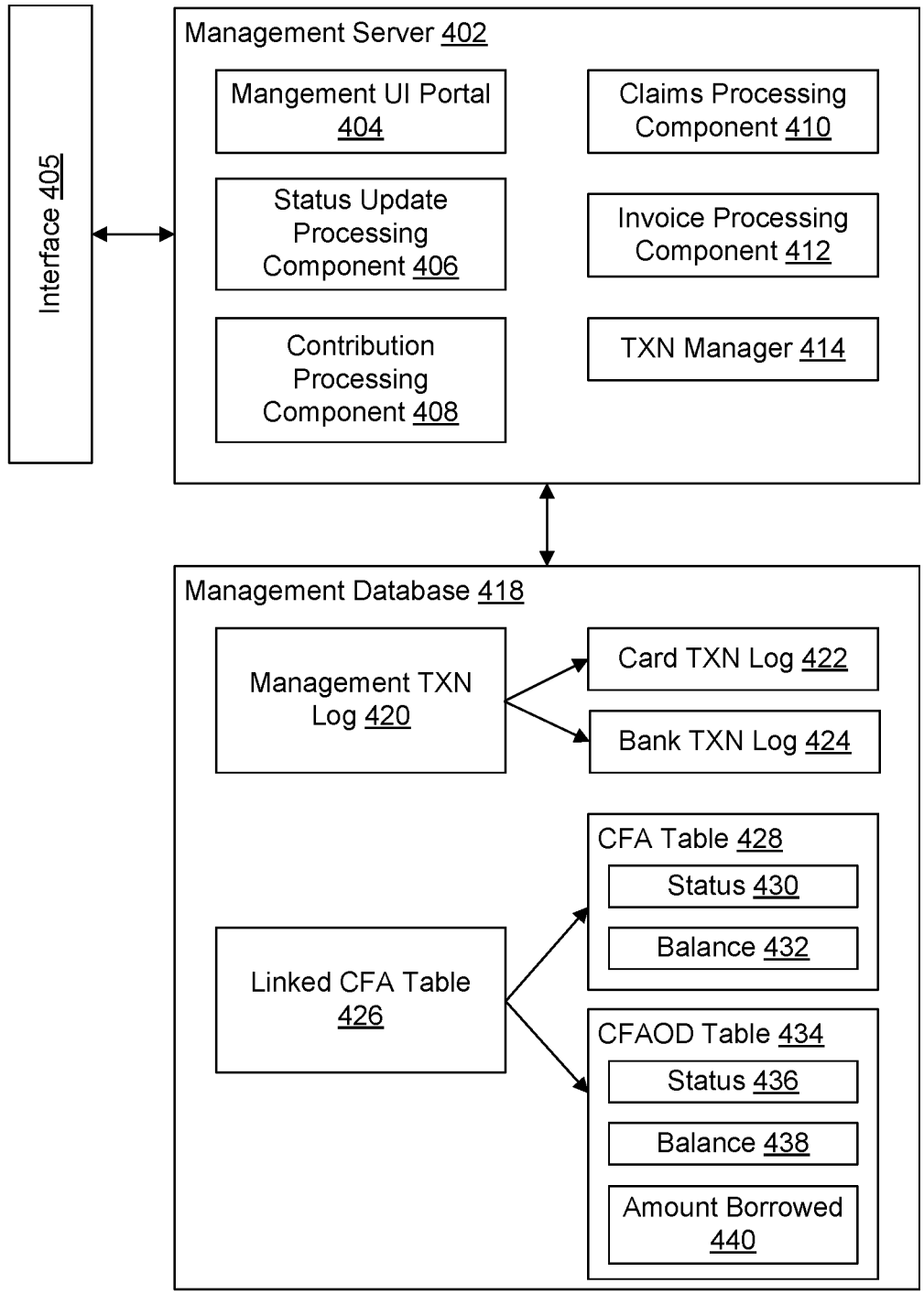
FIG. 4 is an example block diagram illustrating the components within an accounts management system to reconcile contribution funded accounts stored across multiple systems to enable accelerated access to the contribution funded accounts, according to an example embodiment.

FIG. 4 illustrates plan management system 400 maintained by a plan manager for managing linked CFAs of one or more employers and corresponding employees across multiple entities, according to an exemplary embodiment of plan management system 108. Plan management system 400 may include interface 405, management server 402, and management database 418. Though depicted as a single server, management server 402 may be representative of a plurality of servers, each of which may be implemented by one or more processors. Likewise, management database 418 may be representative of a plurality of databases coupled to a plurality of management servers. Management database 418 may be implemented on one or more storage devices.

Interface 405 may be configured to enable plan management system 400, specifically management server 402, to communicate with one or more of the systems depicted in FIG. 1. Though depicted as a separate component, interface 405 may be implemented within management server 402, according to an exemplary embodiment.

Management database 418 may be configured to store employer information and employee information via one or more database tables or management TXN log(s) 420. Employer information may include employer benefit plan offerings and related information or restrictions as described in FIG. 2. Employee information may include various information such as census information, salaries, employment status, associated employer, elected employer plan, contribution amounts, linked CFA account information, and other information related to customizing a linked CFA. In an embodiment, employee information may also include investment information such as a proportion of funds within a linked CFA that are currently allocated for investing. Investment information may be received by investment entities via file and web services.

The linked CFA information may be stored in linked CFA table 426 associating an employee with a linked CFA. Based on sub-accounts designated by an elected employer plan, linked CFA table may be linked to CFA table 428, storing traditional CFA information, and CFAOD table 434, storing CFAOD information. Other types of sub-accounts and CFAs may be linked to a linked CFA account in linked CFA table 426. To maintain an employee's CFA, a CFA record within CFA table 428 may include a status 430 field and a balance 432 field. To maintain an employee's CFAOD, a CFAOD record within CFAOD table 434 may include a status 436 field, a balance 438, and an amount borrowed 440 field.

Status 430 and 436 may reflect a status of an employee's CFA and CFAOD, respectively. For example, status 430 may indicate a CFA is ACTIVE, CLOSED, PENDING, or SUSPENDED. These statuses may correspond to a CFA set up at a bank. Status 436 may indicate a CFAOD is ACTIVE, FROZEN, IN-COLLECTION, or CLOSED. These statuses may be unique due to the properties of a CFAOD. A FROZEN state may indicate that funds of a CFAOD may not be accessible and transferred to a CFA to enable an employee accelerated access to future contributions. The FROZEN status may be set if, for example, an employee elects to invest funds within his linked CFA. The IN-COLLECTION status may be set when an employee's linked CFA account is terminate if, for example, the employee leaves the employer before the end of the plan year.

Balance 432 and 438 may reflect an account balance of an employee's CFA and CFAOD, respectively. As explained, balance 432 represents real funds corresponding to funds stored in a CFA at the bank, and balance 438 represents future contributions of the plan year less any amount borrowed 440 to service a claim. Amount borrowed 440 may total a current amount of CFAOD funds borrowed to service one or more claims less any amount repaid via an employee's periodic contributions.

Management TXN log 420 may store transactions received from any system of FIG. 1. In an embodiment, management TXN log 420 primarily stores transaction records related to employee contributions and claims. Management TXN log 420 may be linked to card TXN log 422 and bank TXN log 424. Card TXN log 422 may contain card transactions generated while processing a transaction stored in management TXN log 420. Bank TXN log 424 may contain bank transactions generated while processing a transaction stored in management TXN log 420. These card and bank transactions may be generated when, for example, processing contributions and claims. In an embodiment, records within card TXN log 422 and bank TXN log 424 may be stored within one transaction log, such as management TXN log 420.

Management server 402 may be configured to include management UI portal 404, status processing component 406, contribution processing component 408, claims processing component 410, invoice processing component 412, and TXN manager 414. One or more of the depicted components may be implemented as processing systems comprising one or more sub-components. These sub-components may include an interface for communicating within and/or across systems and a distribution component for sending information to other components and/or across systems.

Management UI portal 404 may be configured to allow a provider and its employees the capability to adjust and maintain employee's statuses, employers' offerings, and information related to an employee's linked CFA. Adjustments made within management UI portal 404 may be propagated to employer accounts system 106, bank accounts system 110, and/or card accounts system 112. In an embodiment, management UI portal 404 may be configured to allow a provider to view details of employee CFAs (including linked CFAs) such as CFA statuses, CFA balances, transactions of claims filed per employee, and transactions related to contributions to CFAs for each employer serviced by plan management system 108. In addition to viewing details, management UI portal 404 may be configured to provide analytics and report generation capabilities.

Status update processing component 406 may be configured to communicate with status update processing component 306 in employer accounts system 300 in order reconcile updates to an employee's linked CFA across the multiple systems of FIG. 1 including plan management system 108, bank accounts system 110, and card accounts system 112. For example, status update processing component 406 may receive a request from employer accounts system 108 for updating an employee's linked CFA. Accordingly, status update processing component 406 may update records stored in management database 418, such as linked CFA table 426. Then, status update processing component 406 may initiate a reconciliation process and send update information to bank accounts system 110 and card accounts system 112. In an embodiment, updating the linked CFA may include enrolling a new or existing employee into a linked CFA in accordance with an employee elected employer benefit plan.

Contribution processing component 408 may be configured to communicate with contribution processing component 308 in employer accounts system 300 in order to reconcile an employee's contributions across the multiple systems of FIG. 1 including plan management system 108, bank accounts system 110, and card accounts system 112. Upon receiving a contribution file from employer accounts system 106, contribution processing component 308 may resolve the pledged contributions to generate a CFR as described in FIG. 3. Then, contribution processing component 408 may then reconcile the linked CFA stored in linked CFA table 426 and associated tables CFA table 428 and CFAOD table 434 before generating and sending transactions to bank accounts system 110 and card accounts system 112 to reconcile one or more sub-accounts of linked CFA stored external to plan management system 400.

In an embodiment, contribution processing component 408 may be configured to accept a direct contribution from an employee via CFA update component 204 of employee UI portal 202. In an embodiment, because the direct contribution is not automatically deducted from the employee's paycheck at the end of a pay period, the contribution amount may be added to the CFA of the linked CFA and no updates to the CFAOD may be made.

Claims processing component 410 may be configured to communicate with claims generation component 206 in employee UI portal 202 in order to reconcile an employee's submitted claims across the multiple systems of FIG. 1 including plan management system 108, bank accounts system 110, and card accounts system 112. Upon receiving a claims request from employee UI portal 202, claims processing component 408 may resolve the claims request and reconcile the linked CFA, stored in linked CFA table 426 and associated tables CFA table 428 and CFAOD table 434, before generating and sending transactions to bank accounts system 110 and card accounts system 112 to reconcile one or more sub-accounts of linked CFA stored external to plan management system 400. In an embodiment, claims processing component may also or instead be configured to communicate with a benefits plan provider, which submits an employee's claims.

In an embodiment, claims processing component 410 may be similarly configured to communicate with card accounts system 112 in order to reconcile an employee's claim(s) request made on a card across the multiple systems of FIG. 1 including plan management system 108, bank accounts system 110, and card accounts system 112. A claims request may be generated within card accounts system 112 when a user swipes a card associated with funds of a linked CFA to pay for services. Upon receiving a claims request, likely in the form of payment transactions, from card accounts system 112, claims processing component 408 may resolve the claims request and reconcile the linked CFA stored in linked CFA table 426 and associated tables CFA table 428 and CFAOD table 434 before generating and sending transactions to bank accounts system 110 to reconcile one or more sub-accounts of linked CFA stored external to plan management system 400. In an embodiment, no transactions may need to be sent to card accounts system 112 because the claims request was originated on card accounts system 112.

Invoice processing component 412 may be configured to periodically communicate with invoice reporting component 310 in employer accounts system 300 in order to keep balances maintained within employer accounts system 106 and plan management system 107 in sync. For example, during contribution processing, invoice processing component 412 may generate and send a CFR, as described in FIG. 3, to employer accounts system 106. In another example, during claims processing, invoice processing component 412 may generate and send an EWFR detailing payback records and billing records for an employer's employees, as described in FIG. 3. In summary, invoices may be generated and sent by invoice processing component 412 such that expenses paid by borrowing from CFAODs, which represent future not-yet-received contributions, are billed to the employer and any portion of the borrowed funds of CFAODs repaid by employees are refunded or paid back to the employer.

In an embodiment, when an employee leaves the employer, invoice processing component 412 may be configured to manage and track collections to be retrieved from the employee to pay funds borrowed from CFAODs. In an embodiment where actual collections take place between the employee and his employer, invoice processing component 412 may only track the collection transaction information received from employer accounts system 106 and periodically send reports detailing status of collections to employer accounts system 106.

TXN manager 414 may be configured to manage transactions received from any of the systems in FIG. 1 and generate associated transactions while processing employee status updates, employee contributions, and employee claims via one of the components depicted in management server 402. Received transactions may be stored in management TXN log 420 and generated transactions may be stored in card TXN log 422 and bank TXN log 424. As part of reconciling a linked CFA across the multiple systems of FIG. 1, TXN manager 414 may send the generated bank and card transactions to TXN manager 604 in bank accounts system 600 and TXN manager 504 in card accounts system 500, respectively.

Figure 5:
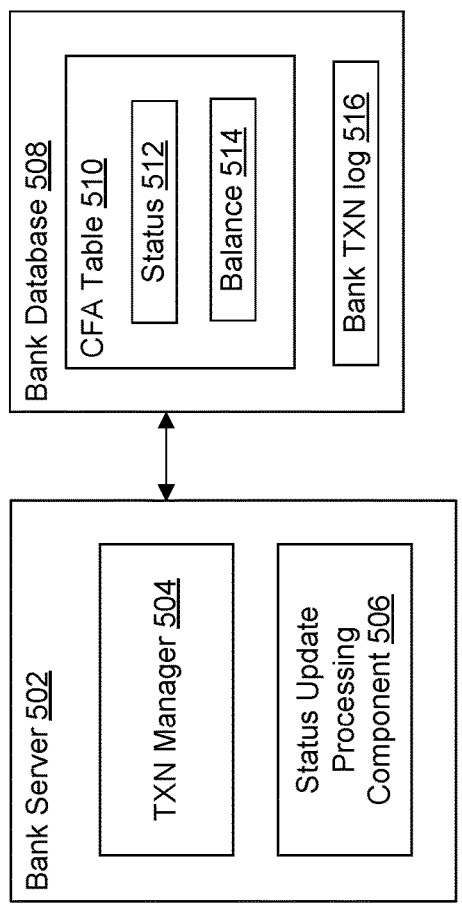
FIG. 5 is an example block diagram illustrating the components within a bank accounts system to manage contribution funded accounts at a bank, according to an example embodiment.

FIG. 5 illustrates bank accounts system 500 maintained by a bank for managing CFAs of one or more employers and corresponding employees, according to an exemplary embodiment of bank accounts system 110. Bank accounts system 500 may include bank server 502 and bank database 508. Though depicted as a single server, bank server 502 may be representative of a plurality of servers, each of which may be implemented by one or more processors. Likewise, bank database 508 may be representative of a plurality of databases coupled to a plurality of bank servers. Additionally, one or more of the depicted components may be implemented as processing systems comprising one or more sub-components. These sub-components may include an interface for communicating within and/or across systems and a distribution component for sending information to other components and/or across systems.

Bank database 508 may be configured to store employee information via one or more database tables and bank TXN logs. Employee information may include an employee's personal information and information related to a CFA stored in CFA table 510. Similar to a CFA stored in CFA table 428 at a management database 418, a CFA account stored in CFA table 510 is associated with status 512 and balance 514 corresponding to status 430 and balance 432, respectively. Whereas the CFA stored in CFA table 510 may be associated with a real banking account, the CFA stored in CFA table 428 in a management database 418 may be a proxy for the real banking account. Therefore, in an embodiment, bank database 508 may store traditional CFAs, but not a CFAOD because the funds within the CFAOD represent contributions yet-to-be received.

Bank database 508 may also be configured to store and maintain transaction logs within bank TXN log 516. These transactions may be received, for example, from TXN manager 414 within plan management system 400. The received transactions may then be applied to various fields of a CFA account in CFA table 510.

Bank server 502 may be configured to include TXN manager 504 and status update processing component 506. Status update processing component 506 may be configured to communicate with status update processing component 406 in plan management system 400 in order to reconcile an employee's bank CFA with a proxy CFA stored at the plan management system 400. For example, status update processing component 506 may receive a request from plan management system 400 to update an employee's bank CFA. Accordingly, status update processing component 506 may update records stored in bank database 508, such as changing status 512 to CLOSED or updating an amount of balance 514. Update results may be sent to plan management system 400. In an embodiment, updating the bank CFA may include enrolling a new or existing employee into a new bank CFA in accordance with the received request. In this exemplary embodiment, status update processing component 506 may generate a new bank CFA identifier and return the CFA ID along with enrollment results to plan management system 400.

TXN manager 504 may be configured to process transactions received from one or more of the systems or computers depicted in FIG. 1 as would be understood by one skilled in the art. In an embodiment, TXN manager 504 may be configured to receive transactions generated by plan management system 400 for contribution and claim reconciliation as described in FIG. 3. Upon resolving the received transactions and applying associated updates to CFAs in CFA table 510, TXN manager 504 may send results of transaction processing to plan management system 400.

Figure 6:
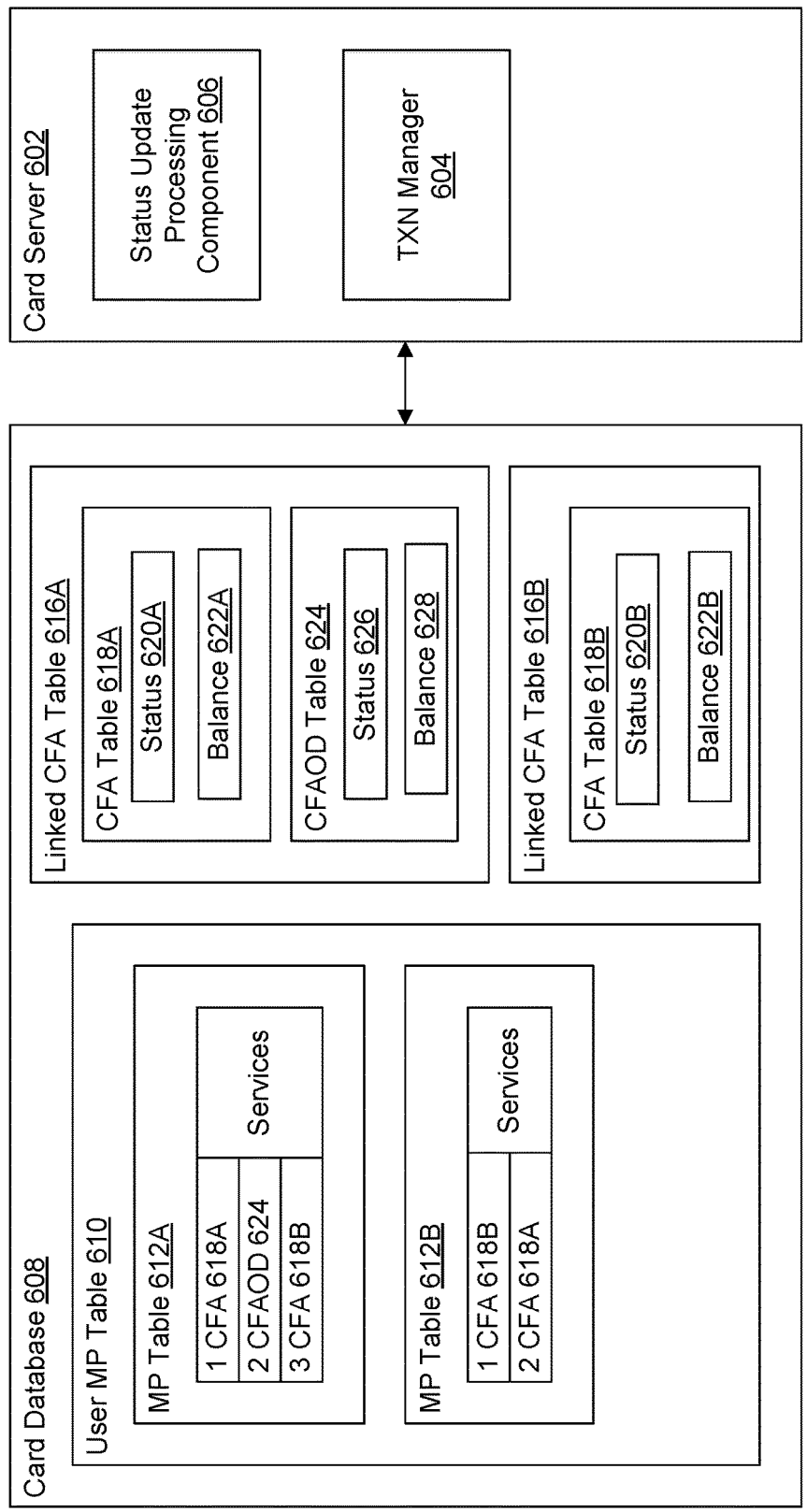
FIG. 6 is an example block diagram illustrating the components within a card accounts system to manage contribution funded accounts at a card vendor, according to an example embodiment.

FIG. 6 illustrates card accounts system 600 maintained by a card vendor for managing CFAs of employees from one or more employers, according to an exemplary embodiment of card accounts system 112. Card accounts system 600 may include card server 602 and card database 608. Though depicted as a single server, card server 602 may be representative of a plurality of servers, each of which may be implemented by one or more processors. Likewise, card database 608 may be representative of a plurality of databases coupled to a plurality of card servers. Additionally, one or more of the depicted components may be implemented as processing systems comprising one or more sub-components. These sub-components may include an interface for communicating within and/or across systems and a distribution component for sending information to other components and/or across systems.

Card database 608 may be configured to store card TXN logs and employee information via one or more database tables. Employee information may include an employee's personal information and information related to the employee's one or more linked CFAs stored in linked CFA table 616. In this exemplary embodiment, each linked CFA specified by an employer benefit plan may be stored in a separate linked CFA table 616. But, in an embodiment, disparate linked CFAs may be stored and maintained within one or more common tables. Linked CFAs may each include one or more sub-accounts. For example, linked CFA table 616A may contain a linked CFA comprising a first sub-account CFA stored in CFA table 618A and a second sub-account CFAOD stored in CFAOD table 624. In contrast, linked CFA table 616A may contain only a CFA within CFA table 618B without containing a corresponding nominal CFAOD. The statuses and balances of CFAs and CFAODs may correspond to those described for CFAs and CFAODs stored within management database 418 in FIG. 4. The main difference is that the funds within the linked CFAs and related sub-accounts are representative of funds on a card that a user may use to pay for qualified services when the card is swiped. Each linked CFA and associated sub-accounts may be associated with qualified service types according to respective employer benefit plans.

User multi-purse (MP) table 610 may be configured to store MP tables 612 needed to service an employee's card account. In an embodiment, an employee's card account may be associated with linked CFAs stored in linked CFA table 616A and linked CFA table 616B. Not only do the restrictions, qualified service types, and other details of linked CFAs differ based on the employer benefit plan, but also information and restrictions of sub-accounts within the linked CFAs may differ as well based on the employer benefit plan. To efficiently manage how and whether funds within a card account can be used, MP tables 612 may be configured to store a set of sub-accounts, an order to process accounts within the set, and qualified service types of one or more sub-accounts within the set. An MP table 612 may correspond to one or more linked CFA accounts of an employee. In an embodiment, an MP table 612 may only correspond to one linked CFA account of an employee.

For example, MP table 612A specifies the following sub-accounts enabled on the employee's card: CFA 618A, CFAOD 624, CFA 618B. The labels following the sub-accounts represent accounts stored in corresponding sub-account tables. MP table 612A also specifies a priority from high (1) to low (3) to use funds of the sub-accounts to pay for card transactions. MP table 612A may also store qualified services for corresponding sub-accounts based on employer benefit plan(s). In contrast, MP table 612B may exclude the sub-account CFAOD 624 from its set of stored sub-accounts. Additionally, CFA 618B may be assigned a higher priority (1) than CFA 618A, assigned a priority of (2).

In an embodiment, an MP table 612 may be selected based on an MP index received from plan management system 400. The MP index may be determined at plan management system 400 based on one or more statuses of an employee's corresponding one or more linked CFAs. For example, if an employee's CFA funds are currently being invested, the received MP index may select MP table 612B, which effectively disables access to accelerated funds provided by a CFAOD on the card. This option may be selected to reduce risk and simplify reconciliation of linked CFAs maintained by plan management system 400.

Card server 602 may be configured to include TXN manager 604 and status update processing component 606. Status update processing component 606 may be configured to communicate with status update processing component 406 in plan management system 400, in order to reconcile an employee's card CFA with a proxy CFA stored at the plan management system 400. For example, status update processing component 606 may receive a request from plan management system 400 to update an employee's card CFA. Accordingly, status update processing component 606 may update records stored in card database 608, such as changing status 620B to CLOSED or selecting MP table 612B to use during card transaction processing based on a received MP index. Results of updates and any errors may be sent to plan management system 400. In an embodiment, updating the card CFA may include enrolling a new or existing employee into a new card (linked) CFA in accordance with the received request. In this exemplary embodiment, status update processing component 606 may receive a card account number from plan management system 400 and generate a new card account associated with one or more linked CFAs. Then, status update processing component 606 may return enrollment results to plan management system 400. In an embodiment, when enrolling an employee into a new card account, status update processing component 606 may generate a new card account number while generating a new card account and transmit the new card account number upon successfully generating the new card account.

TXN manager 604 may be configured to process transactions received from one or more of the systems or computers depicted in FIG. 1 as would be understood by one skilled in the art. In an embodiment, TXN manager 604 may be configured to receive transactions generated by plan management system 400 for contribution and claim reconciliation as described in FIG. 3. Upon resolving the received transactions and applying associated updates to CFAs and CFAODs stored in linked CFA tables 616, TXN manager 604 may send results of transaction processing to plan management system 400.

Figure 7:
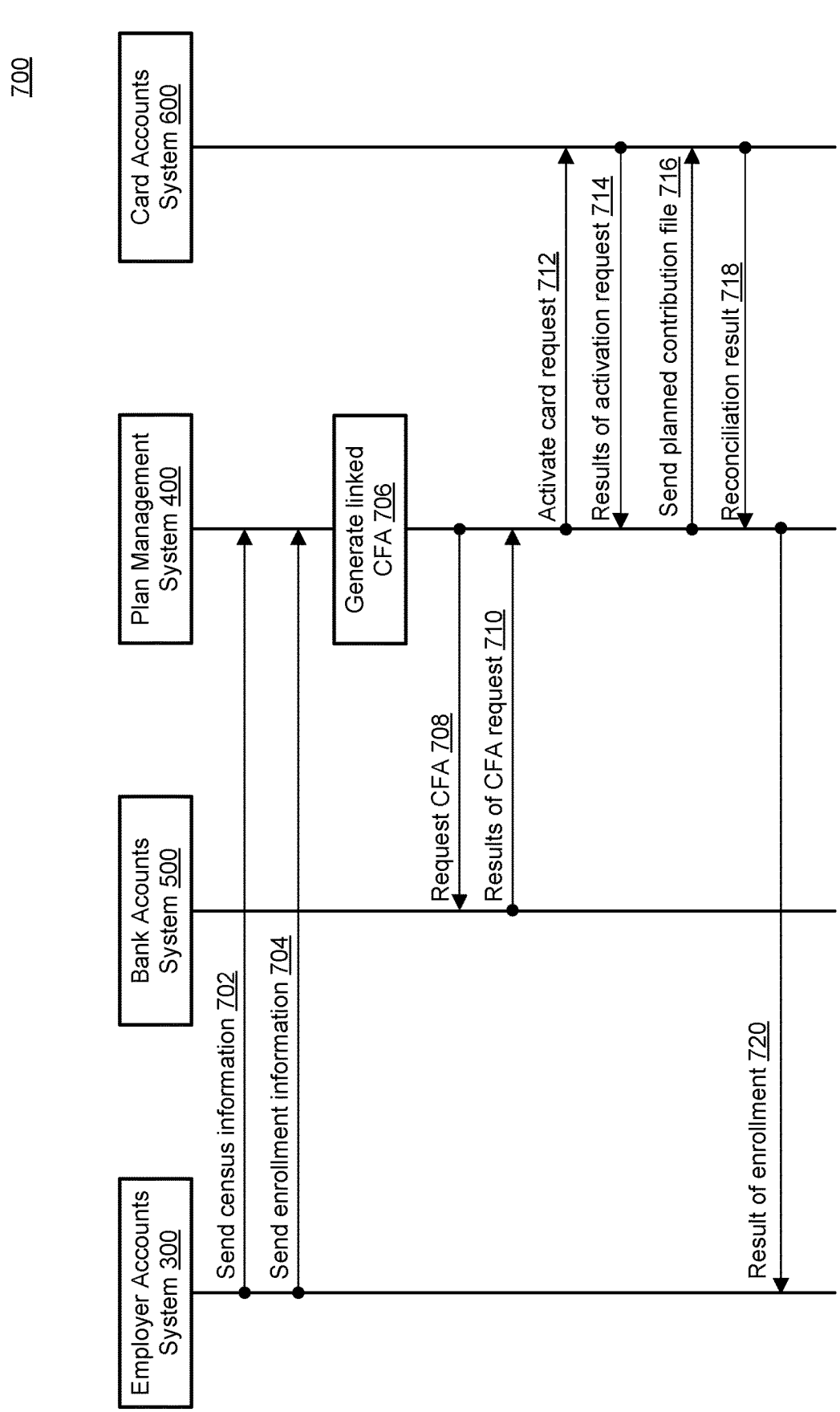
FIG. 7 is a sequence diagram illustrating a process for reconciling contribution funded accounts across multiple systems in order to enroll an employee into an accelerated contribution funded account plan, according to an example embodiment.

FIG. 7 illustrates an enrollment process 700 for reconciling CFAs across multiple systems in order to enroll an employee into a linked CFA enabling accelerated access to funds in CFAs, according to an example embodiment. The multiple systems may include employer account system 300, plan management system 400, bank accounts system 500, and card accounts system 600 as described in FIGS. 3-6, respectively. Process 700 may be performed by processing logic that may include hardware (e.g., circuitry, dedicated logic, programmable logic, microcode, etc.), software (e.g., instructions run on a processing device), or a combination thereof. In an embodiment, steps in FIG. 7 may not need to be performed in the exact order shown, as one skilled in the arts would understand. In an embodiment, enrollment process 700 may be adjusted to enable updating a pre-existing linked CFA associated with the employee.

In step 702, status update processing component 306 within employer accounts system 300 may send census information associated with an employee to plan management system 400, as described in FIG. 3. Step 702 may be initiated when an employee is hired by an employer and/or when an employee decides to enroll into a new linked CFA according to his elected employer benefit plan. Upon receiving the census information at plan management system 400 via interface 405, status processing component 406 within plan management system 400 may store the employee and associated census information into management database 418. But, no CFA information may yet be associated with the stored employee record.

In step 704, status update processing component 306 may send enrollment information related to an employee's enrollment into an elected employer benefit plan. As described in FIG. 3, the enrollment information may include a type of linked CFA, a proportion of an employee's income to be contributed to the CFA for each pay period, the number of pay periods in a plan year, and a contribution amount from the employer to the CFA per pay period. The enrollment information may depend on the elected employer benefit plan, the employer, and the plan manager. In an embodiment, steps 702 and 704 may be condensed into a single step where both census information and enrollment information of an employee may be sent by employer accounts system 300 to plan management system 400. In an embodiment where update information is to be sent instead of enrollment information, step 702 may be omitted and status update processing component 306 may send update information to plan management system 400 in step 704.

In step 706, upon receiving the enrollment information at plan management system 400 via interface 405, status processing component 406 may be configured to generate a linked CFA for the employee according to the elected employer benefit plan. Depending on the elected employer benefit plan, one or more of the following sub-accounts may be generated and linked to the linked CFA: a CFA funded by the employer, a CFA funded by the employee, and a CFAOD. If an employee did not elect into an accelerated CFA, then the CFAOD may be omitted from the linked CFA. In an embodiment, for an employee with existing funds in a preexisting CFA, the funds will remain unchanged. But, funds within an existing CFAOD may be adjusted according to the received update enrollment (or update) information. The amount enabled by the linked CFA upon successfully processing enrollment and/or updates will be a sum of existing funds (which may have been rolled over from a previous plan year) stored in a CFA and a total of the future contributions in the plan year to be used to fund a CFAOD. In an embodiment, an employer may have the capability to restrict/cap a maximum annual contribution amount and/or a maximum amount that may be borrowed or advanced from the CFAOD to the CFA in the linked CFA, as described in FIG. 3.

In step 708, status processing component 406 may be configured to request bank accounts system 500 to set up a bank CFA corresponding to a sub-account CFA of a linked CFA generated in step 706. The bank CFA may correspond to a traditional CFA. In an embodiment, if the linked CFA does not contain a CFA, then the bank CFA will not be set up and step 708 may be omitted. In this embodiment, the linked CFA may contain one or more CFAODs. In an embodiment where update information instead of enrollment information is received at plan management system 400, status processing component 406 may request bank accounts system 500 to update information within a bank CFA. In an embodiment when step 708 is not omitted, status update processing component 506 in bank accounts system 500 may process the received request, as described in FIG. 5.

In step 710, status update processing component 506 may be configured to send a result of processing the request. The result may confirm whether the bank CFA was successfully generated (or updated) or errors that were encountered during account generation. In an embodiment, the result may also include a bank account number when generated by bank accounts system 500. In an embodiment, if step 708 was omitted, then step 710 may also be omitted.

In step 712, upon successfully creating a bank CFA, status update processing component 506 may send a card activation request to card accounts system 600. In an embodiment, the card activation request may include a card account generated by plan management system 400 to be associated with a card account created at card accounts system 600.

In step 714, status update processing component 606 of card accounts system 600 may set up or update the card account and send a corresponding result of the activation request to plan management system 400, as described in FIG. 6.

In step 716, plan management system 400 may send a planned contribution file upon receiving confirmation that both a bank CFA and the card associated with one or more linked CFAs have been successfully generated for an employee. The planned contribution file may include a number of pay periods in a plan year and a contribution amount (or proportion of income) to be taken from an employee's paycheck for each pay period to fund a linked CFA. In an embodiment, a total of all future contributions in the plan year may be included in the planned contribution file. Status update processing component 606 in card accounts system 600 may receive the planned contribution file and update funds within a card CFAOD of a linked CFA to reconcile a card CFAOD with a CFAOD stored at plan management system 400. By reconciling the funds between the card and the plan manager, the funds within the CFAOD at the card may be initialized with an amount specified by the employer benefits plan.

In step 718, status update processing component 606 may send reconciliation results back to plan management system 400.

In step 720, status processing component 406 may send a result confirming that the employee has been successfully enrolled into a linked CFA if the results from steps 710 and 718 do not indicate any errors. Otherwise, the confirmation result may include possible errors encountered while trying to enroll the employee.

Figure 8:
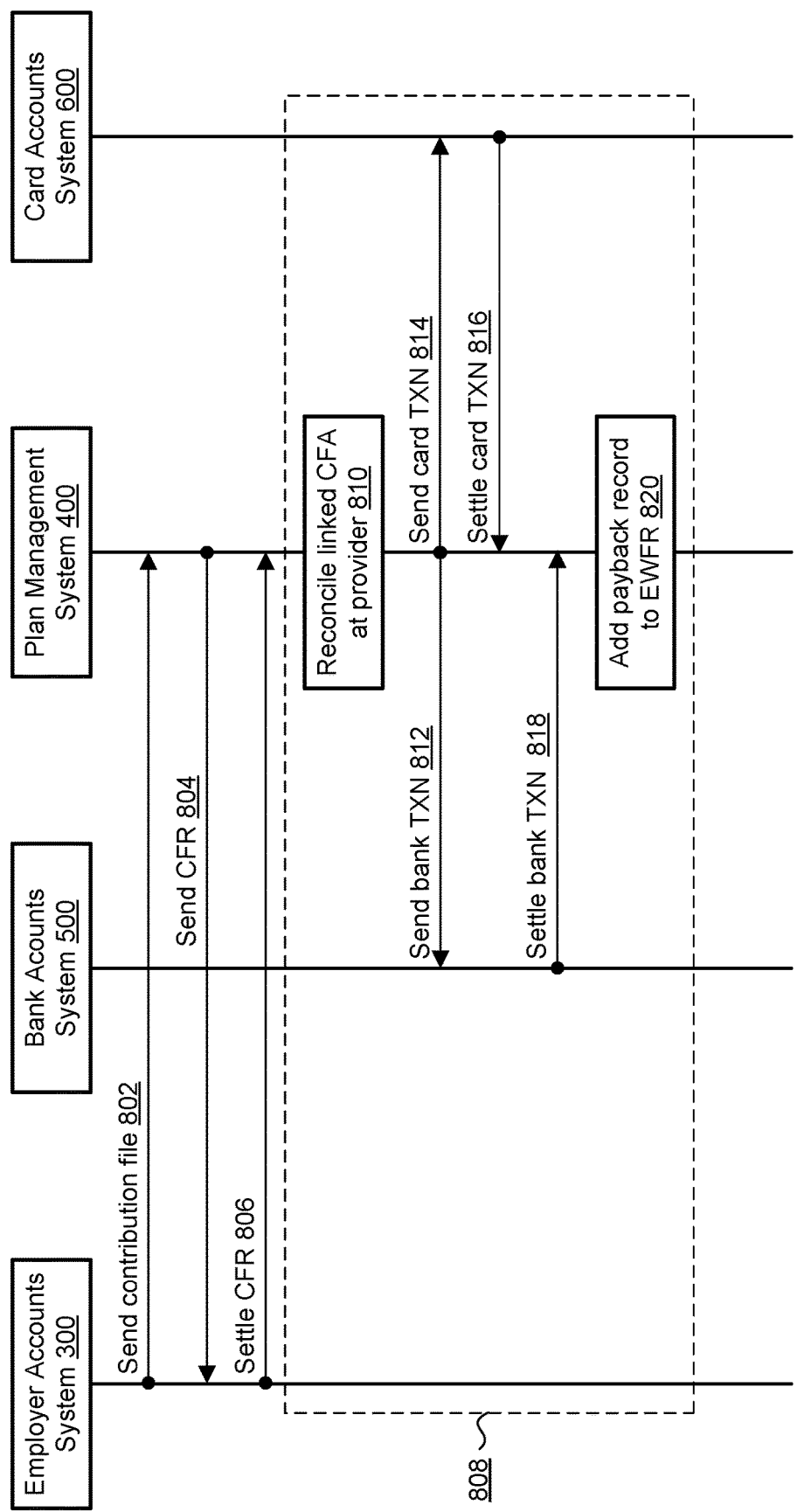
FIG. 8 is a sequence diagram illustrating a process for reconciling accelerated contribution funded accounts across multiple systems in order to process a contribution from an employer, according to an example embodiment.

FIG. 8 illustrates a contribution process 800 for reconciling CFAs across multiple systems in order to apply an employee contribution to his linked CFA, enabling accelerated access to funds in CFAs, according to an example embodiment. The multiple systems may include employer account system 300, plan management system 400, bank accounts system 500, and card accounts system 600 as described in FIGS. 3-6, respectively. Process 800 may be performed by processing logic that may include hardware (e.g., circuitry, dedicated logic, programmable logic, microcode, etc.), software (e.g., instructions run on a processing device), or a combination thereof. In an embodiment, some steps in FIG. 8 may not need to be performed in the exact order shown as one skilled in the arts would understand. For example, depending on the processing times of bank accounts system 500 and card accounts system 600, step 818 may be performed before step 816.

In step 802, contribution processing component 308 of employer accounts system 300 may send a contribution file to plan management system 400, as described in FIG. 3. The contribution file may contain pledged contribution amounts of employees' corresponding paychecks that may be used to fund linked CFAs in the next pay period according to employees' elected employer benefit plans. The contribution file may be sent periodically, for example, before the beginning of a next pay period. Upon receipt of the contribution file, contribution processing component 408 may resolve the pledged contribution amounts and generate a contributions funding request (CFR). The CFR indicates a proportion of the contribution amounts in the contribution file sent in step 802 that have been verified by plan management system 400 that should be sent by employer accounts system 300 to plan management system 400. A contribution amount for an employee may not be verified if, for example, the employee's linked CFA has been suspended or terminated.

In step 804, contribution processing component 408 may be configured to send the CFR to employer accounts system 300.

In step 806, contribution processing component 308 may settle the received CFR and send the pledged contribution amounts specified in the CFR to plan management system 400. In an embodiment, the pledged contribution amounts may be sent via respective contribution transactions. In an embodiment, to settle a contribution amount for one employee, the employee's elected contribution may be deducted from the paycheck corresponding to a next pay period. Then, the deducted amount may be transmitted to plan management system 400.

In step 810, contribution processing component 408 may initiate a contribution reconciliation process 808 by reconciling the linked CFA at the plan management system 400. To reconcile a linked CFA account stored in linked CFA table 426, contribution processing component 408 may use the received contribution amount to pay back as much of the amount borrowed 440 in the CFAOD as possible, effectively minimizing the amount borrowed 440. When the amount borrowed 440 is zeroed and a portion of the contribution amount remains, the remaining contribution amount may be deducted from balance 438 of the CFAOD and contributed, effectively transferred, to the balance 432 of the CFA. Further details of the contribution reconciliation process 808 are discussed in FIG. 12.

In contrast to traditional procedures for adding a contribution to a CFA or even a linked CFA, contribution processing component 408 may be configured to delay contribution reconciliation of sub-accounts within the linked CFA until the CFR is settled and plan management system 400 receives the employee's pledged contribution amount in step 806. Because an employee enrolled in a linked CFA maintains access to both a CFA containing real funds and a CFAOD containing funds that are expected to be contributed, no benefit is provided by updating a CFA or a CFAOD as soon as possible. Therefore, reconciliation may be delayed until enough information is received to reconcile both the CFA and CFAOD at the same time. This is an important advantage over traditional procedures, as it ensures that the employee always has the full amount of their CFA and the linked CFAOD available to them at all times— no reduction in total funds available to the employee due to processing lag times occurs. Upon reconciliation at the plan manager, an amount of funds specified by the contribution amount may be added to the CFA and the same amount may be deducted from the CFAOD. The contribution amount is effectively transferred from the CFAOD to the CFA and a total of funds within the linked CFA remains the same.

Upon resolving the contribution of at least the CFAOD, contribution processing component 408 may be configured to generate one or more bank transactions to be associated with the contribution transaction. The one or more bank transactions may be stored in bank TXN log 424. In an embodiment, a possible bank transaction may be to contribute a portion of the received pledged contribution amount to a bank CFA such that a balance 514 of the bank CFA matches a resolved balance 432 of the corresponding CFA in the management database 418.

In step 812, contribution processing component 408 may be configured to send the generated bank transaction.

Upon resolving the contribution of at least the CFAOD, contribution processing component 408 may be configured to generate one or more card transactions to be associated with the contribution transaction. The one or more card transactions may be stored in card TXN log 422. In an embodiment, a first card transaction may be to deduct a portion of the balance 628 in a card CFAOD such that balance 628 matches a resolved balance 438 of the corresponding CFAOD at the provider. The second transaction, sent with the first transaction, may be to contribute an amount to balance 622A of a card CFA such that balance 628 matches a resolved balance 432 of the corresponding CFA in the management database 418. Similar to reconciliation at plan management system 400, by adding the contribution amount to balance 622A of the card CFA and deducting the same amount from balance 628 of the CFAOD at the same time, the total amount of funds within the linked CFA at the card remains unchanged before and after the contribution reconciliation process. Therefore, an employee using the card is not affected by the time it takes to process the effective transferring of funds from the CFAOD to the CFA.

In step 814, contribution processing component 408 may be configured to send, in concurrence with performing step 812, the generated one or more card transactions. By concurrently sending transactions to be applied at the bank and the card vendor, latencies between sending the transactions and receiving transaction results may be minimized. In traditional processes, bank transactions associated with real funds in CFAs may need to be processed before increasing real funds in CFAs at the card. But, with a linked CFA comprising a CFA and a CFAOD operating according to embodiments of the present invention, card transactions may be sent before or in concurrence with sending bank transactions. This ensures that the employee always has the full amount of their CFA and the linked CFAOD available to them at all times, rather than having the total balance of the two drop because of latency between the reduction of available funds in the CFAOD record on the card due to the logged contribution, and the increase in available funds in the CFA record on the card due to bank processing delays.

In step 816, TXN manager 604 at card server 602 may settle and apply the received one or more card transactions if no rules or restrictions of an employer benefit plan are violated. Then, TXN manager 604 may send a result of the settlement to plan management system 400. The result may indicate errors if any were encountered.

Likewise in step 818, TXN manager 504 at bank server 502 may settle and apply the received one or more bank transactions if no rules or restrictions of an employer benefit plan are violated. Then, TXN manager 504 may send a result of the settlement to plan management system 400. The result may indicate errors if any were encountered.

Upon receiving settlement results from step 816 and step 818, contribution processing component 408 may initiate an error reconciliation process to update the linked CFA in management database 418 if any errors were encountered. One or more subsequent card transactions may be generated and sent to card accounts system 600 to reconcile updated balances at the provider with balances of the linked CFA at the card. Due to the incorporation of a CFAOD in the linked CFA, even when an error is encountered, a portion of the funds in the card CFA may be effectively transferred back to the CFAOD, but the total funds of the CFA and the CFAOD remains the same. An employee using a card linked to a linked CFA retains access to the total funds, which is not affected by errors encountered during contribution reconciliation.

In step 820, if any portion of the pledged contribution amount was used to pay off an amount borrowed 440 in step 810, invoice processing component 412 may be configured to add a payback record to an EWFR, as discussed in FIG. 4.

Figure 9:
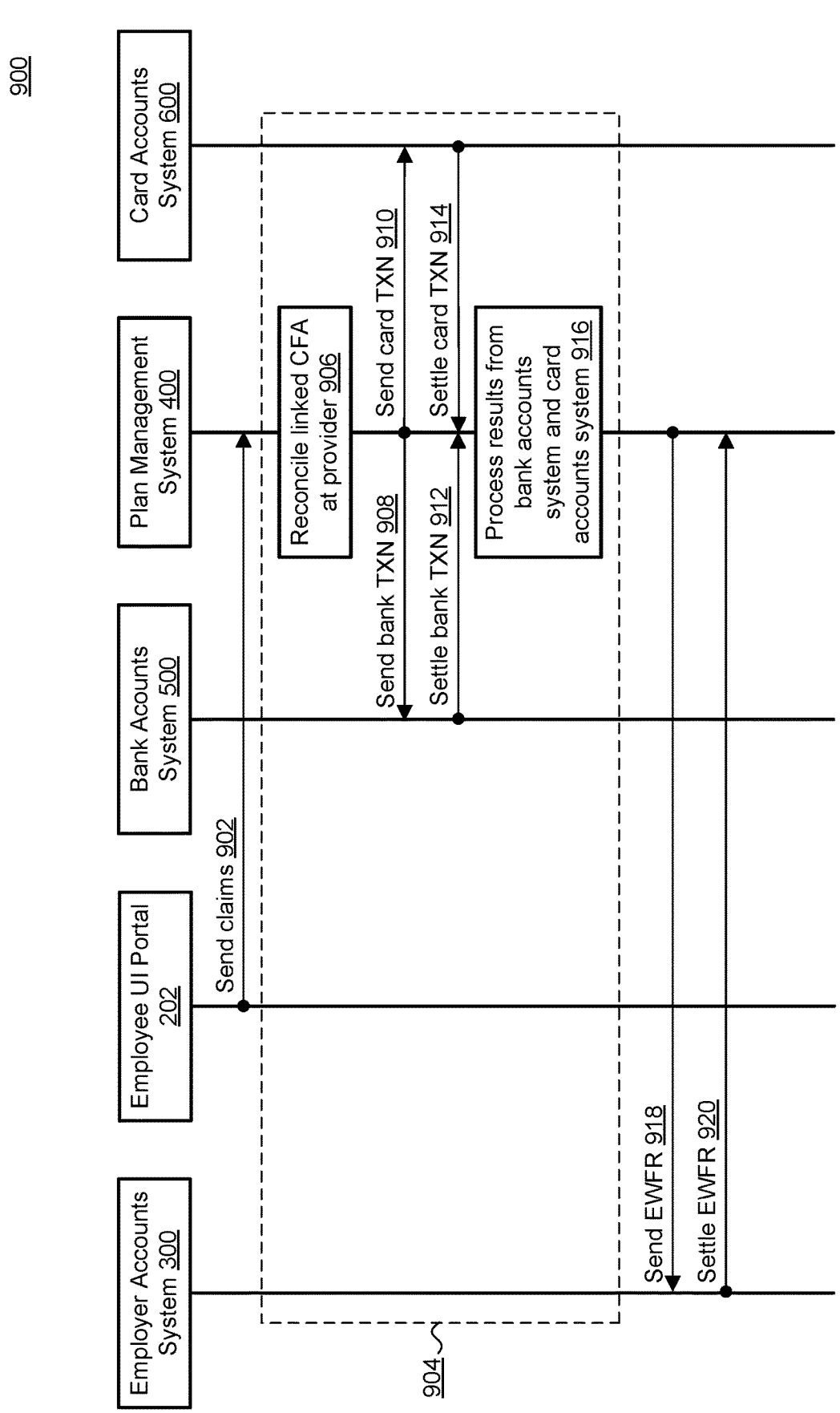
FIG. 9 is a sequence diagram illustrating a process for reconciling accelerated contribution funded accounts across multiple systems in order to apply a claims request from an employee, according to an example embodiment.

FIG. 9 illustrates a claims process 900 for reconciling CFAs across multiple systems in order to apply an employee's claim via employee UI portal 202 to his linked CFA, enabling accelerated access to funds in CFAs, according to an example embodiment. The multiple systems may include employee UI portal 202, employer account system 300, plan management system 400, bank accounts system 500, and card accounts system 600 as described in FIGS. 2-6, respectively. Process 900 may be performed by processing logic that may include hardware (e.g., circuitry, dedicated logic, programmable logic, microcode, etc.), software (e.g., instructions run on a processing device), or a combination thereof. In an embodiment, some steps in FIG. 9 may not need to be performed in the exact order shown as one skilled in the arts would understand. For example, depending on the processing times of bank accounts system 500 and card accounts system 600, step 914 may be performed and completed before step 912.

In step 902, claims generation component 206 in employee UI portal 202 may send a claims request for an employee to plan management system 400. The claims request for the employee may be inputted into employee UI portal 202 by the employee via employee computer 104. In an embodiment, the claims request may be sent as one or more claims transactions. As described in FIG. 2, a claims request may contain a claim amount, a service type, a date of the service, and/or a servicing entity providing the service for an employee. The claims request may be sent to plan management system 400 on a periodic basis or when prompted by an a benefits plan administrator.

In step 906, claims processing component 410 may initiate a claims reconciliation process 904 by reconciling the linked CFA at the plan management system 400. To reconcile a linked CFA account stored in linked CFA table 426, claims processing component 410 may use the funds within the linked CFA as specified by priorities stored in card accounts system 600 for the employee, to determine whether the entire claim amount may be paid or reimbursed. The priorities may indicate not only which sub-accounts are available to pay the claim, but also which order to draw the funds from the eligible sub-accounts. If a total of the available funds within the linked CFA are sufficient, funds from balance 432 of a CFA may be used before drawing funds from balance 438 of a CFAOD within the linked CFA. In an embodiment, if funds within the CFA are insufficient, an amount of funds may be deducted from balance 438 of the CFAOD and contributed, effectively transferred, to the balance 432 of the CFA. The deducted amount is representative of an amount borrowed from the CFAOD and added to amount borrowed 440. Further details of the claims reconciliation process 904 are discussed in FIG. 13.

In step 908, claims processing component 410 may be configured to send one or more bank transactions. Claims processing component 410 may be configured to generate the one or more bank transactions to be associated with the received claims transaction upon resolving the claims request at the plan management system 400. The one or more bank transactions may be stored in bank TXN log 424.

In an embodiment, a possible bank transaction may be to contribute the amount deducted from the CFAOD at plan provider system 400 to a bank CFA such that a balance 514 of the bank CFA matches a resolved balance 432 of the corresponding CFA in the management database 418. Another possible bank transaction may be to deduct the claims amount from the bank CFA to service the claims request.

In step 910, claims processing component 410 may be configured to send, in concurrence with performing step 908, one or more card transactions. Claims processing component 410 may be configured to generate the one or more card transactions to be associated with the received claims transaction upon resolving the claims request at the plan management system 400 in step 906. The one or more card transactions may be stored in card TXN log 422. In an embodiment, a first card transaction may be to deduct a portion of the balance 628 in a card CFAOD such that balance 628 matches a resolved balance 438 of the corresponding CFAOD at the provider. A second transaction may be to add an amount to balance 622A of a card CFA such that balance 628 matches a resolved balance 432 of the corresponding CFA in the management database 418. A third transaction may be to deduct the claim amount from the bank CFA. In an embodiment, one or more of the first, second, and third transactions may be combined such that after processing the transaction(s), the balances of the linked CFA at the card vendor match the balances of the linked CFA at the provider.

By concurrently sending transactions to be applied at the bank and the card vendor, latencies between sending the transactions and receiving transaction results may be minimized. This is an advantage over traditional processes. In traditional processes, bank transactions associated with real funds in CFAs may need to be processed before increasing real funds in CFAs at the card. But, with a linked CFA comprising a CFA and a CFAOD, card transactions may be sent before or in concurrence with sending bank transactions such that the employee always has the maximum amount of funds available at all times.

In step 912, TXN manager 504 at bank server 502 may settle and apply the received one or more bank transactions if no rules or restrictions of an employer benefit plan are violated. Then, TXN manager 504 may send a result of the settlement to plan management system 400. The result may indicate errors if any were encountered.

Likewise in step 914, TXN manager 604 at card server 602 may settle and apply the received one or more card transactions if no rules or restrictions of an employer benefit plan are violated. Then, TXN manager 604 may send a result of the settlement to plan management system 400. The result may indicate errors if any were encountered.

In step 916, upon receiving settlement results from step 912 and step 916, claims processing component 410 may process the received settlement results. In an embodiment, claims processing component 410 may initiate an error reconciliation process to update the linked CFA in management database 418 if any errors were encountered. One or more subsequent card transactions may be generated and sent to card accounts system 600 to reconcile updated balances at the provider with balances of the linked CFA at the card. Due to the incorporation of a CFAOD in the linked CFA, even when an error is encountered, a portion of the funds in the card CFA may be effectively transferred back to the CFAOD, but the total funds of the CFA and the CFAOD remains the same. An employee using a card linked to a linked CFA retains access to the total funds, which is not affected by errors encountered during contribution reconciliation.

In an embodiment, as part of step 916, claims processing component 410 may add a billing record to an EWFR if an amount was deducted, effectively borrowed, from balance 438 of the CFAOD of a linked CFA to service a claim, as discussed in FIG. 4. In an embodiment, only claims that borrowed from balance 438 of the CFAOD may be added as a billing record to the EWFR. In an embodiment, claims processing component 410 may add the billing record to the EWFR at the end of step 906. But if any errors were encountered, the added billing record may need to be adjusted in step 916.

In step 918, the EWFR containing payback and billing records may be sent by invoice processing component 412 in plan management system 400 to employer accounts system 300.

In step 920, invoice reporting component 310 in employer accounts system 300 may process the received EWFR and settle the amounts as specified in the EWFR. Accordingly, a result of the settlement including payment amounts may be sent to plan management system 400.

Figure 10:
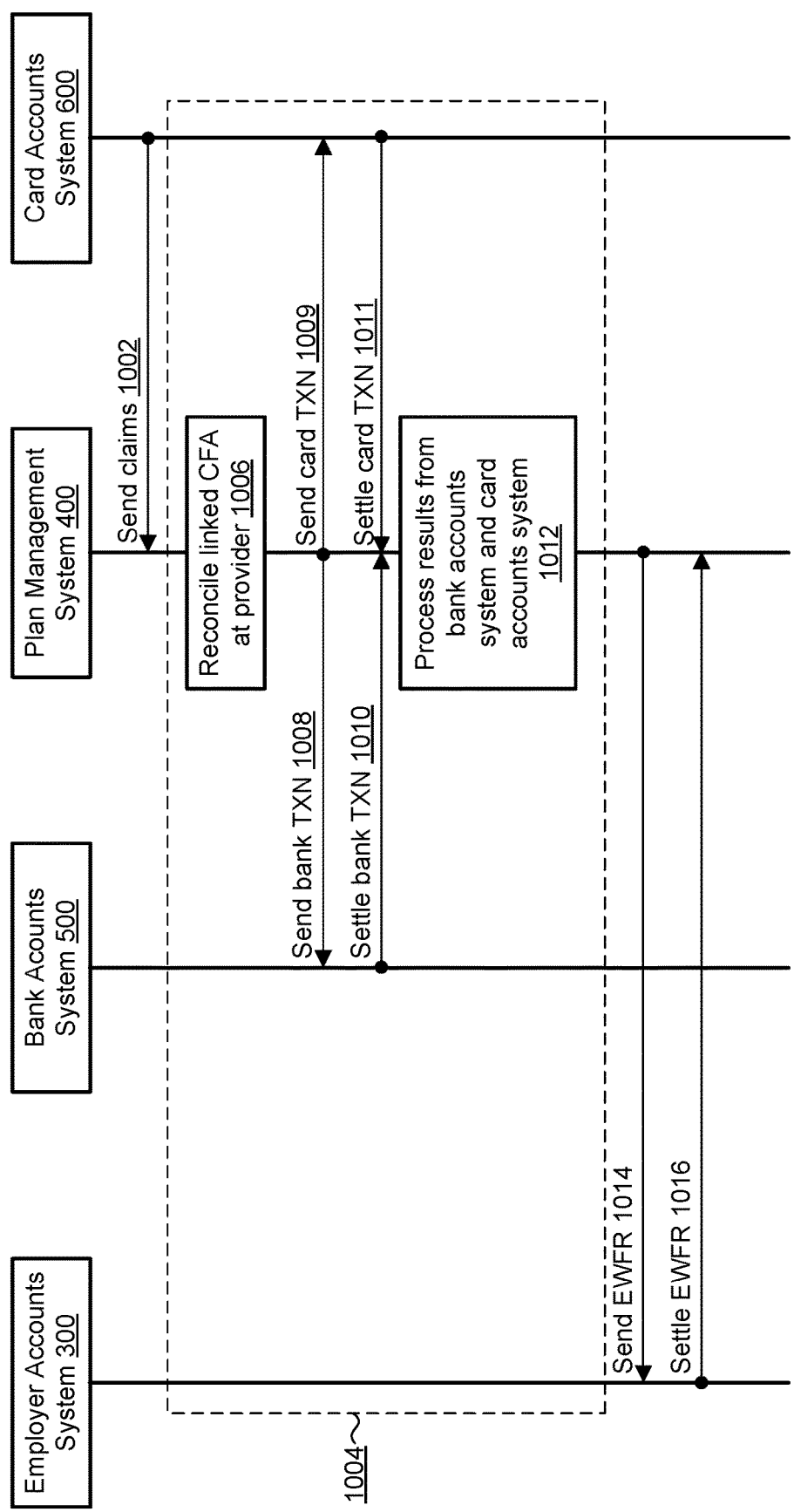
FIG. 10 is a sequence diagram illustrating a process for reconciling accelerated contribution funded accounts across multiple systems in order to apply a claims request from a card vendor, according to an example embodiment.

FIG. 10 illustrates a claims process 1000 for reconciling CFAs across multiple systems in order to apply an employee's claim, originating from a card, to his linked CFA enabling accelerated access to funds in CFAODs of linked CFAs, according to an example embodiment. The multiple systems may include employer account system 300, plan management system 400, bank accounts system 500, and card accounts system 600 as described in FIGS. 3-6, respectively. Process 1000 corresponds closely with process 900, but one or more steps of process 900 may be omitted because the claim request is originated by a card maintained by a card vendor in card accounts system 600. Process 1000 may be performed by processing logic that may include hardware (e.g., circuitry, dedicated logic, programmable logic, microcode, etc.), software (e.g., instructions run on a processing device), or a combination thereof. In an embodiment, some steps in FIG. 10 may not need to be performed in the exact order shown as one skilled in the arts would understand.

When an employee pays for a service using his card associated with a linked CFA, TXN manager 604 in card accounts system 600 may generate a claims transaction representative of the attempted card payment for the service. The claims transaction may be viewed as a claims request made by the employee. The card payment may be initiated when, for example, the employee swipes his card to pay for a service.

In step 1002, TXN manager 604 may send a claims request in the form of the generated claims transaction to plan management system 400. In an embodiment, the claims request may be sent as one or more claims transactions. As described in FIG. 6, a claims request generated at the card may contain a claim amount, a date of service, a service type, and/or a servicing entity. The claims request may be sent to plan management system 400 at the point-of-sale when the card is swiped to pay for a service. In an embodiment, the claims request received at plan provider system 400 may include a transaction indicating a total claims amount to be drawn from the CFA regardless of whether the total claims amount exceeds the funds within the CFA.

In step 1006, claims processing component 410 may initiate a claims reconciliation process 1004 by reconciling the linked CFA at the plan management system 400. Similar to the processes described in step 906 of FIG. 9 and further discussed in FIG. 13, to reconcile a linked CFA account stored in linked CFA table 426, claims processing component 410 may use the funds within the linked CFA as specified by a selected MP table to determine whether the entire claim amount may be serviced or denied. The balances of sub-accounts within the linked CFA are resolved accordingly.

In step 1008, claims processing component 410 may similarly generate one or more bank transactions to associate with the claims transaction and send the generated bank transaction(s), as described in step 908 of FIG. 9.

In step 1009, claims processing component 410 may generate one or more card transactions to transfer any amount deducted/borrowed from the CFAOD to fund the CFA to cover the remaining balance, as described in step 910 of FIG. 9. In an embodiment, if the CFAOD funds at the card in card accounts system 600 were not borrowed to service a card transaction, then step 1009 and corresponding step 1011 may not need to be performed.

In step 1010, TXN manager 504 at bank server 502 may settle and apply the received one or more bank transactions if no rules or restrictions of an employer benefit plan are violated. Then, TXN manager 504 may send a result of the settlement to plan management system 400. The result may indicate errors if any were encountered.

Likewise in step 1011, TXN manager 604 at card server 602 may settle and apply the received one or more card transactions if no rules or restrictions of an employer benefit plan are violated. Then, TXN manager 604 may send a result of the settlement to plan management system 400. The result may indicate errors if any were encountered.

In step 1012, upon receiving the settlement result from step 1010 and settlement result from step 1011 if step 1009 was initiated, claims processing component 410 may process the received settlement result. Because the claims request originated from card accounts system 600, the balances within the linked CFA of the card at card accounts system 600 may be presumed to be up-to-date and no further card transactions may need to be transmitted between plan management system 400 and card accounts system 600.

In an embodiment, claims processing component 410 may initiate an error reconciliation process to update the linked CFA in management database 418 if any errors were encountered. As part of error reconciliation, one or more subsequent card transactions may be generated and sent to card accounts system 600 to reconcile updated balances at the provider with balances of the linked CFA at the card. Due to the incorporation of a CFAOD in the linked CFA, even when an error is encountered, a portion of the funds in the card CFA may be effectively transferred back to the CFAOD, but the total funds of the CFA and the CFAOD remains the same. An employee using a card linked to a linked CFA retains access to the total funds, which is not affected by errors encountered during contribution reconciliation.

In step 1014, the EWFR containing payback and billing records may be sent by invoice processing component 412 in plan management system 400 to employer accounts system.

In step 1016, invoice reporting component 310 in employer accounts system 300 may process the received EWFR and settle the amounts as specified in the EWFR. Accordingly, a result of the settlement including payment amounts may be sent to plan management system 400.

Figure 11:
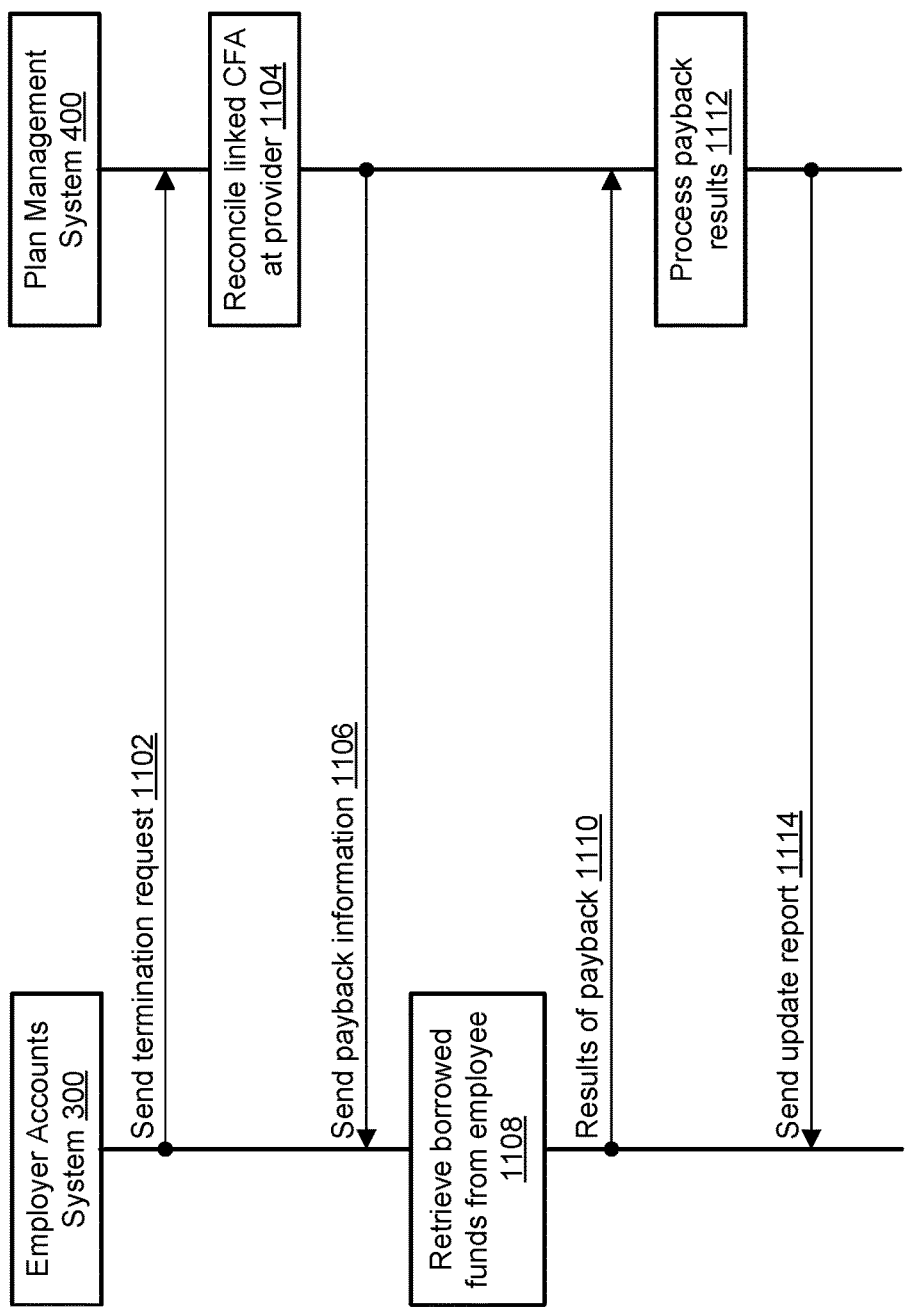
FIG. 11 is a sequence diagram illustrating a process for reconciling accelerated contribution funded accounts between an employer and a plan manager when an employee leaves the employer, according to an example embodiment.

FIG. 11 illustrates a method 1100 for reconciling accelerated contribution funded accounts between employer accounts system 300 and plan management system 400 when an employee leaves his employer. Method 1100 may be performed by processing logic that may include hardware (e.g., circuitry, dedicated logic, programmable logic, microcode, etc.), software (e.g., instructions run on a processing device), or a combination thereof. In an embodiment, some steps in FIG. 11 may not need to be performed in the exact order shown as one skilled in the arts would understand.

In step 1102, status update processing component 306 may send a termination request to plan management system 400 indicating an employee is to be terminated from one or more linked CFAs.

In step 1104, status update processing component 406 in plan management system 400 may reconcile a linked CFA of the terminated employee. In an embodiment, status 430 of a CFA may be set to CLOSED and status 436 of a CFAOD may be set to IN-COLLECTION. If the amount borrowed 440 in the CFAOD is zero, status update processing component 406 may instead set a CFAOD of the linked CFA to CLOSED. Relatedly (not shown in FIG. 11), status update processing component 406 may send associated transactions to the bank and the card vendor via TXN manager 414 to close related CFAs and CFAODs. Alternatively, if the employee is to maintain the CFA, the CFA may remain open with any existing funds available to the employee while status 436 of the CFAOD may be set to CLOSED or IN-COLLECTION.

In step 1106, invoice processing component 412 may send payback information via a payback report to employer accounts system 300. The payback information may indicate whether the employee has a remaining balance in the amount borrowed 440 of any CFAODs and how much the employee has borrowed from the CFAODs.

In step 1108, employer accounts system 300 may record the payback information and an employer may retrieve the specified funds from the employee.

In step 1110, employer accounts system 300 may periodically send results of a progress of the payback/collections process to plan management system 400. In an embodiment, employer accounts system 300 may send results whenever the employee pays back a portion of the specified borrowed amount.

In step 1112, plan management system 400 may process the received payback results. For example, the amount borrowed 440 of a CFAOD may be reduced. In the exemplary embodiment of FIG. 11, the collections process is performed by employer accounts system 300, and plan management system 400 only monitors a status of the collections. In an embodiment, the collections process of step 1108 may be performed by plan management system 400. Depending on the capabilities of employer accounts system 300 and the needs of employers, plan management system 400 may perform the collections process for one employer and only track statuses of the collection process for another employer.

In step 1114, plan management system 400 may send update reports on statuses of CFAODs. These reports may be sent on a periodic basis or be sent in response to received results of step 1110.

Figure 12:
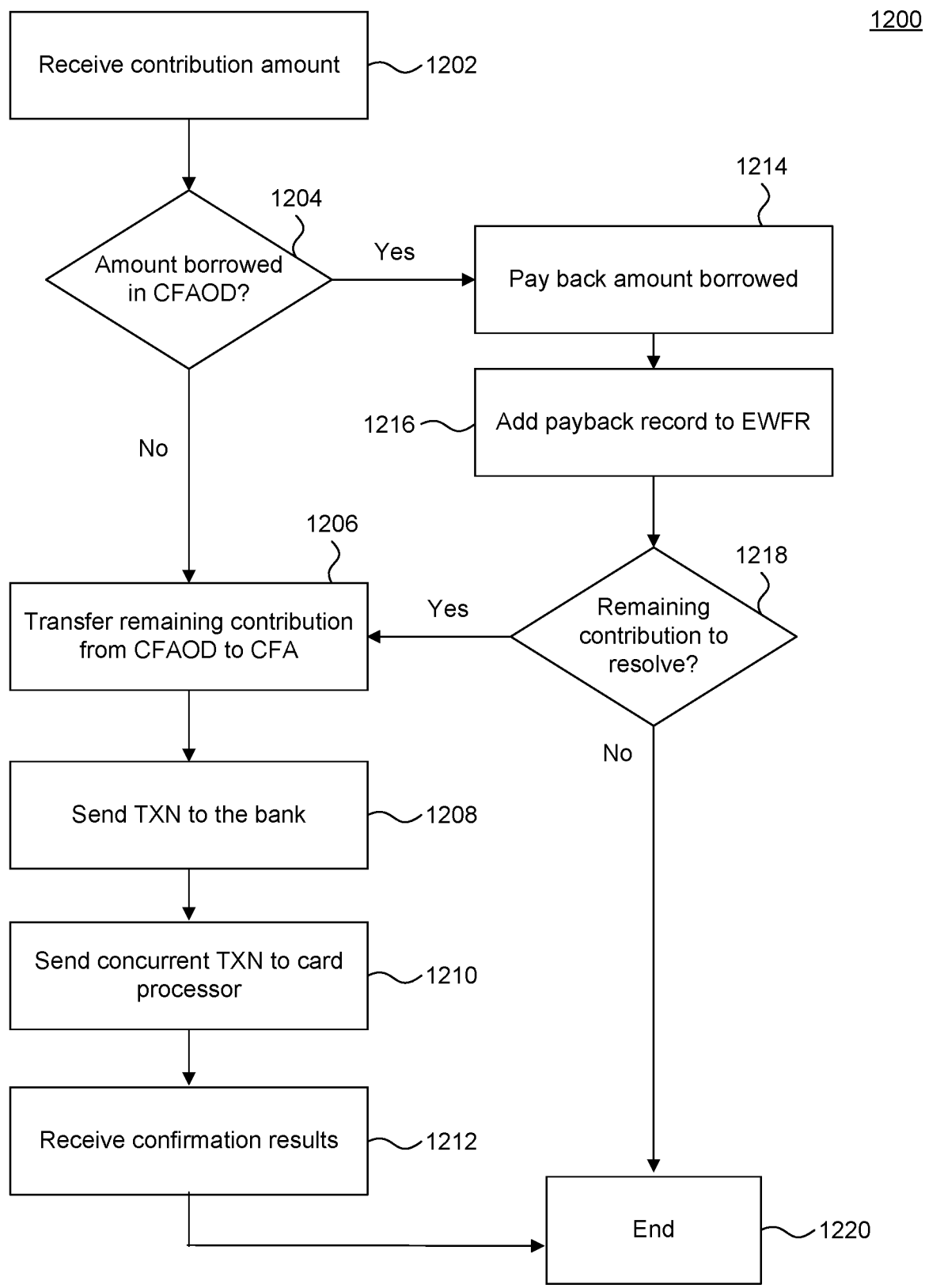
FIG. 12 is a flowchart illustrating steps for reconciling accelerated contribution funded accounts across multiple systems in order to process a contribution from an employer, according to an example embodiment.

FIG. 12 illustrates a method 1200 for reconciling accelerated contribution funded accounts across multiple systems at a plan management system in order to process a contribution from an employer, according to an example embodiment. The multiple systems may include employer account system 300, plan management system 400, bank accounts system 500, and card accounts system 600 as described in FIGS. 3-6, respectively. Method 1200 may correspond to the steps described and detailed in reconciliation process 808 described in FIG. 8. Method 1200 may be performed by processing logic that may include hardware (e.g., circuitry, dedicated logic, programmable logic, microcode, etc.), software (e.g., instructions run on a processing device), or a combination thereof. In an embodiment, some steps in FIG. 12 may not need to be performed in the exact order shown as one skilled in the arts would understand.

In step 1202, contribution processing component 408 may receive a pledged contribution amount for an employee's linked CFA stored in management database 418.

In step 1204, contribution processing component 408 may determine whether an amount borrowed 440 in CFAOD is non-zero. If the amount borrowed 440 exists, method 1200 proceeds to step 1214.

In step 1214, contribution processing component 408 may apply as much of the received contribution amount as possible to pay back and minimize the amount borrowed 440.

In step 1216, invoice processing component 412 may add a payback record to an EWFR. The payback record may contain an amount corresponding to the portion of received contribution amount used to minimize the amount borrowed 440.

In step 1218, contribution processing component 408 may determine whether any portion of the received contribution amount remains and needs to be resolved. If a contribution amount remains, method 1200 proceeds to step 1206.

Returning to step 1204, if the amount borrowed 440 is zero, method 1200 proceeds to 1206. In step 1206, contribution processing component 408 may transfer a remaining contribution amount from the CFAOD to the CFA. In practice, the remaining contribution amount may be deducted from the CFAOD and added to the CFA.

In step 1208, TXN manager 414 may generate bank transactions based on the reconciliation of contributions performed within plan management system 400 and send the bank transactions to bank accounts system 500 to reconcile CFAs stored in bank database 508.

In step 1210, TXN manager 414 may generate card transactions based on the reconciliation of contributions performed within plan management system 400 and concurrently send the card transactions to card accounts system 600 to reconcile CFAs and CFAODs stored in card database 608.

In step 1212, contribution processing component 408 may receive confirmation results of the transactions sent in steps 1208 and 1210. If errors were encountered, an error reconciliation process as described in FIG. 8 may be initiated. Method 1200 ends in step 1220.

Figure 13:
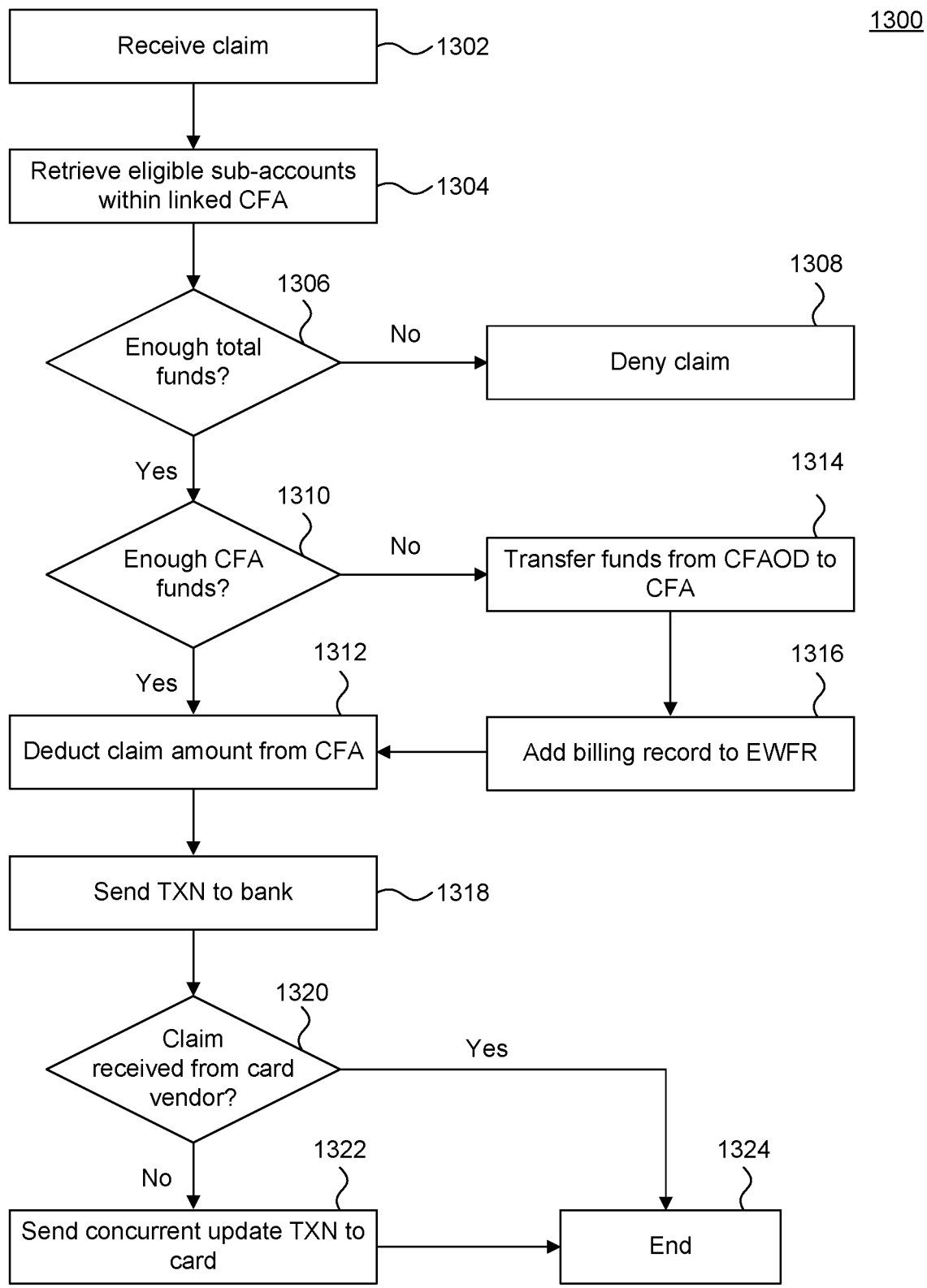
FIG. 13 is a flowchart illustrating steps for reconciling accelerated contribution funded accounts across multiple systems in order to process a claims request, according to an example embodiment.

FIG. 13 illustrates a method 1300 for reconciling accelerated contribution funded accounts across multiple systems at a plan management system in order to process a claim, according to an example embodiment. The multiple systems may include employer account system 300, plan management system 400, bank accounts system 500, and card accounts system 600 as described in FIGS. 3-6, respectively. Method 1300 may correspond to the steps described and detailed in claims reconciliation processes 904 and 1004 described in FIGS. 9 and 10, respectively. Method 1300 may be performed by processing logic that may include hardware (e.g., circuitry, dedicated logic, programmable logic, microcode, etc.), software (e.g., instructions run on a processing device), or a combination thereof. In an embodiment, steps in FIG. 13 may not need to be performed in the exact order shown as one skilled in the arts would understand.

In step 1302, claims processing component 410 may receive a claims request. The claims request may include a service type, a date of the service, the service provider, and a claim amount. The claims request may be received from employee UI portal 202, card accounts system 112, or another entity such as a benefits plan provider.

In step 1304, claims processing component 410 may retrieve information on eligible sub-accounts within the employee's linked CFA to pay for the service. In an embodiment where the claim is received from a card vendor, the claims request may include a multi-purse (MP) indicator which enables claims processing component 410 to select an appropriate MP table, such as MP table 612A that is correspondingly stored in management database 418. By using the appropriate MP table, claims processing component 410 may determine which sub-accounts and in which order to draw funds from the sub-accounts to service the claim. In an embodiment, if the claim is not received from a card vendor, claims processing component 410 may retrieve priorities stored within management database 418 to determine which sub-accounts and in which order to draw funds from the sub-accounts to service the claim. The claim may be received from, for example, a benefits plan provider or an employee manually entering the claim into employee UI portal 202.

In step 1306, claims processing component 410 may add the funds available from an ordered set of sub-accounts (e.g., enabled in MP table 612A for a card transaction) to pay for a claim according to whether the service type of the claim is allowed in the employer benefit plan. For example, funds from CFA 618A may be used before CFAOD 624 and CFA 618B. In an embodiment, CFAs within a linked CFA may always be prioritized over CFAODs within the same linked CFA.

In step 1308, if the funds within the sub-accounts of the linked CFA are insufficient, claims processing component 410 may deny the claim and send a notification to the originator of the claims request.

In step 1310, claims processing component 410 may determine whether enough funds represented by balance 432 within the CFA is sufficient to service the claim amount.

In step 1314, if funds within the CFA is not sufficient, claims processing component 410 may transfer funds from the CFAOD to the CFA. The transferring of funds may include deducting a portion of balance 438 in the CFAOD and adding the deducted portion to balance 432 of the CFA such that balance 432 of the CFA is greater or equal to the claim amount. Additionally, claims processing component 410 may add the deducted portion to an amount borrowed 440 of the CFAOD because an employee is effectively borrowing against his future contributions stored in the CFAOD.

In step 1316, invoice processing component 412 may add a billing record to the EWFR. The billing record may bill the amount deducted from the CFAOD to the employer.

In step 1312, claims processing component 410 may deduct the claim amount from the CFA. Step 1314 may guarantee that if the total funds in the linked CFA are sufficient, at least the claim amount can be deducted from the CFA.

In step 1318, TXN manager 414 may send one or more bank transactions generated to service the claim request and reconcile the bank CFA with the CFA stored in management database 418.

In step 1320, claims processing component 410 may determine whether the claims request was received from a card vendor. If card accounts system 112 associated with a card vendor generated the claims request, then the sub-accounts within the linked CFA will have already been updated and method 1300 ends in step 1324. In an embodiment, if the card transaction indicates an amount to be withdrawn from a card CFA regardless of whether funds from the card CFAOD were used, then method 1300 may instead proceed to step 1322.

In step 1322, claims processing component 410 may send, in concurrence with performing step 1318, one or more card transactions generated to reconcile the card CFAs and CFAODs with the CFAs and CFAODs stored in management database 418. In an embodiment, if the claim was generated by card accounts system 600 via a card swipe, concurrent update transactions may only be sent to the card if funds from card CFAODs were borrowed to service the card transaction.

Figure 14:
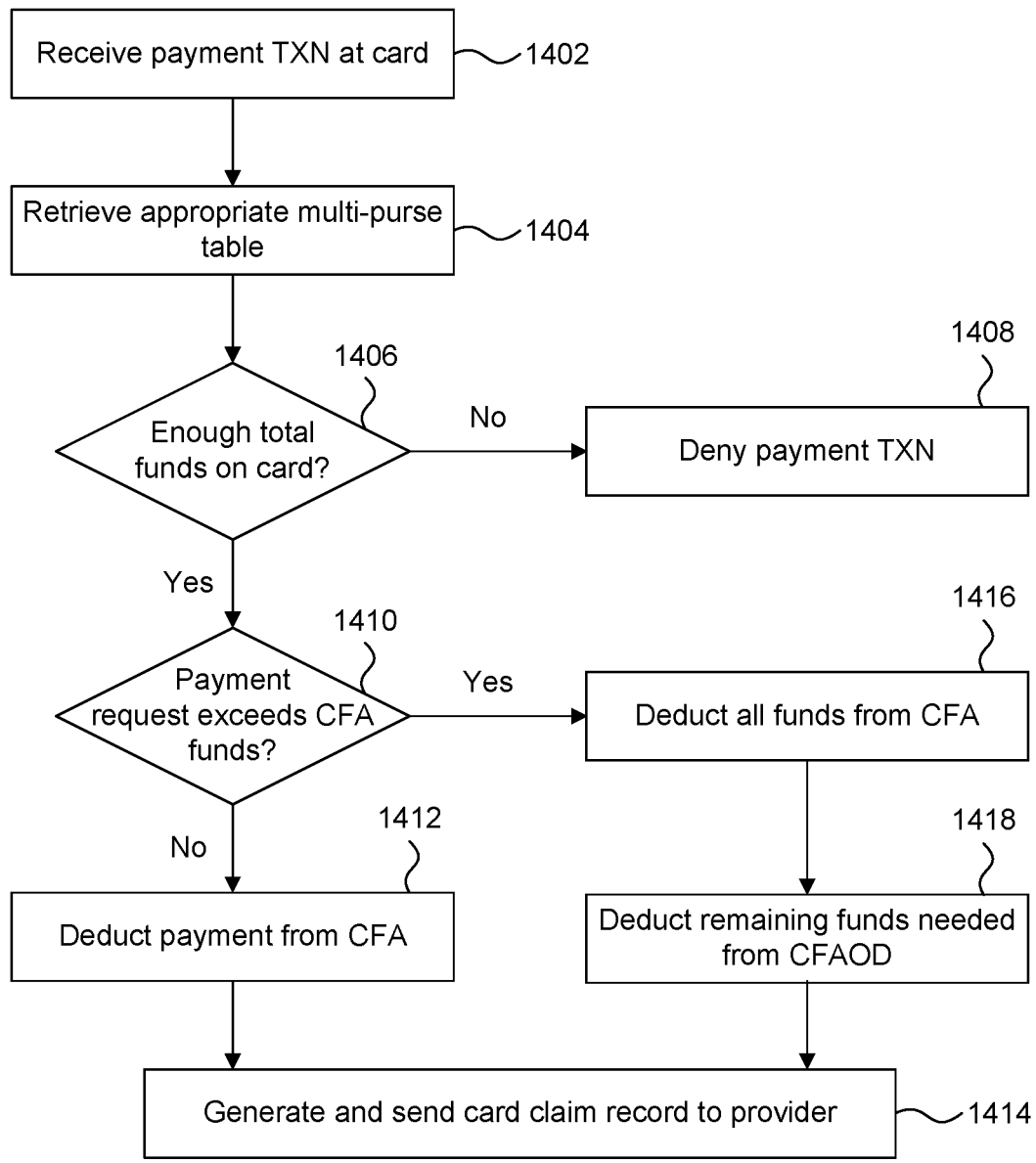
FIG. 14 is a flowchart illustrating steps for reconciling accelerated contribution funded accounts at a card provider in order to process a payment transaction, according to an example embodiment.

FIG. 14 illustrates a method 1400 for reconciling accelerated contribution funded accounts at a card account system, such as card accounts system 600, in order to process a payment transaction (i.e. card claims request) initiated when the card is used by the employee, according to an example embodiment. Method 1400 may correspond to step 1002 described and detailed in FIG. 10. Method 1400 may be performed by processing logic that may include hardware (e.g., circuitry, dedicated logic, programmable logic, microcode, etc.), software (e.g., instructions run on a processing device), or a combination thereof. In an embodiment, steps in FIG. 14 may not need to be performed in the exact order shown as one skilled in the arts would understand.

In step 1402, TXN manager 604 may receive a payment transaction when a card is used or swiped. The payment transaction or claim/payment request may be associated with a service type, service provider, and a claim amount.

In step 1404, card server 602 may retrieve a currently selected MP table 612 associated with a linked CFA of the card account. For example, card server 602 may retrieve MP table 612A.

In step 1406, card server 602 may add the funds available from an ordered set of sub-accounts enabled in the retrieved MP table 612A to determine whether funds in the card account are sufficient to pay for a claim according to whether the service type of the claim is allowed in the employer benefit plan. For example, funds from CFA 618A may be used before CFAOD 624 and CFA 618B.

In step 1408, the funds within the sub-accounts of the linked CFA were found to be insufficient, so card server 602 may deny the claims request and send a notification to the originator of the claims request. In an embodiment, when a card is swiped to pay for a particular service, the transaction may be immediate denied.

In step 1410, card server 602 may determine whether the claim amount exceeds the funds represented by balance 622A within the CFA of the linked CFA stored in the card. If the amount exceeds the funds available in the CFA, method 1400 proceeds to step 1416.

In step 1416, all of the funds may be deducted from the CFA, rendering balance 622A zero, to service the claim amount.

In step 1418, a portion of funds represented by balance 628 may be deducted from the CFAOD to pay off the remaining claim amount.

In step 1412, when the claim amount of the payment request does not exceed balance 622A of the CFA, the claim amount is deducted from balance 622A of the CFA.

In step 1414, TXN manager 604 may generate and send card claim record to plan management system 400. The card claim record may include a card claim transaction specifying the amount deducted from the CFA. If funds from the CFAOD were used, the card claim record may include another card claim transaction specifying the amount deducted from the CFAOD.

Asset Transfer On Demand

While the above description refers to on-demand access for new accounts or newly-funded accounts, one of skill in the relevant art(s) would recognize that such systems and methods would operate equally as well for newly-transferred CFAs. When an employee changes jobs or when an employer changes health insurance providers, the employee may no longer have access to the bank at which his or her CFA is located. The employee will then typically transfer or "roll over" the CFA funds into a new CFA account at a new bank. Between the time that the old CFA account is closed and the time that the new CFA account is opened and the funds clear, the employee traditionally may not have access to his or her funds. This "blackout period" is detrimental to an employee who cannot necessarily control health issues that may give rise to needing the funds.

ATOD bridges the gap that a participating member experiences when moving funds from one bank to another. As with the CFAOD processes and systems, ATOD processes and systems allow the employer to continue to allow usage of the funds during the transition and collects the funds after the transition to reduce the impact to the participating member. In an example embodiment utilizing a point in time balance, ATOD allows a partial amount up to a defined flat dollar threshold or the full amount to be utilized by the member via payment card or through manual claims submission. The defined flat dollar threshold may be determined based on a percentage of funds to be transferred or an amount specified by either the employer or plan manager. This allows the employee uninterrupted use of the account throughout the transition to a new provider. At the end of the transition, the system performs a reconciliation and the appropriate amounts are transferred from the existing balance to cover any amount forwarded to cover eligible expenses. Like CFAOD, this process is virtually seamless to employees and ensures access to care without financial hardship throughout the transition.

Though not common, occasionally overages can occur if balances do not reconcile back to the transferred amounts. This will generally happen based on timing of the posting of transactions to the new bank account but is greatly minimized by the on-demand feature being utilized as of a specific point in time. In the event of an overage, in embodiments the employee will either offset the imbalance with future payroll deductions or provide an additional contribution individually to help make the account whole. In the rare occurrence where a transfer amount cannot be recovered, in an embodiment, this amount is reported to the employer and added to the employee's W2 as a taxable event.

In this manner, ATOD operates similarly to and may operate in conjunction with CFAOD. CFAOD considers projected contributions, while ATOD ensures that balances beyond the annual limit stored in accounts remain available. In an embodiment, though independent of one another, a calculation is performed to ensure that the individual is not able to spend beyond what is recoverable via payroll contributions for the current year and accumulated balances from previous years.

Figure 15:
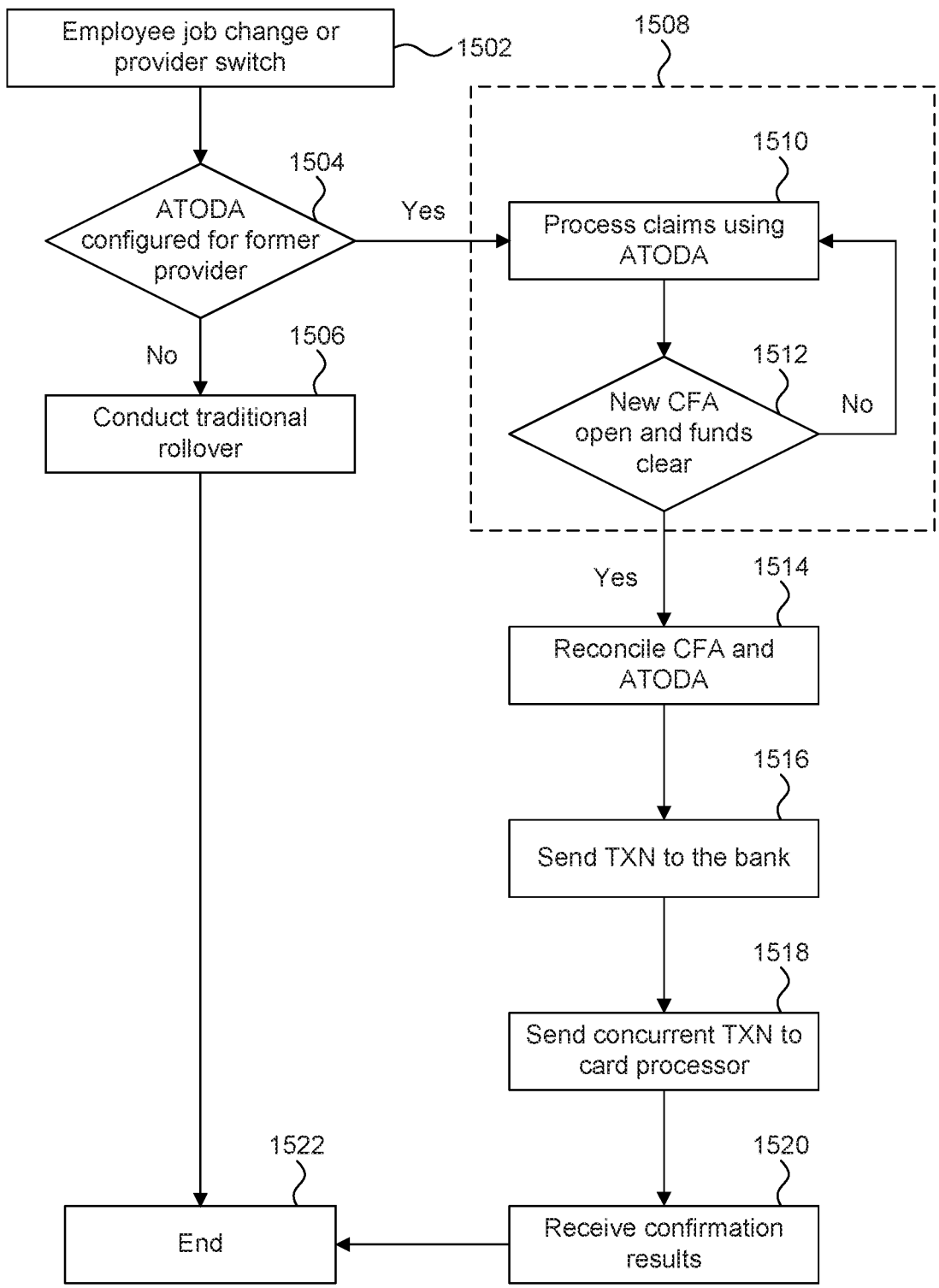
FIG. 15 is a flowchart illustrating steps for reconciling accelerated contribution funded accounts across multiple systems at a plan management system in order to facilitate assert transfer on demand.

FIG. 15 illustrates a method 1500 for reconciling accelerated contribution funded accounts across multiple systems at a plan management system in order to facilitate ATOD, according to an example embodiment. The multiple systems may include employer account system 300, plan management system 400, bank accounts system 500, and card accounts system 600 as described in FIGS. 3-6, respectively. Method 1500 may be analogous to the steps described and detailed in reconciliation process 808 described in FIG. 8. Method 1500 may be performed by processing logic that may include hardware (e.g., circuitry, dedicated logic, programmable logic, microcode, etc.), software (e.g., instructions run on a processing device), or a combination thereof. In an embodiment, some steps in FIG. 15 may not need to be performed in the exact order shown as one skilled in the arts would understand.

In step 1502, contribution processing component 408 may receive a notification when a participating member changes jobs or switches providers. Such a notification may include status and balance information regarding the participating member's new CFA as well as status and balance information regarding the participating member's CFA with the former employer.

In step 1504, contribution processing component 408 may determine whether an employer set up an ATOD account for the participating member. In an embodiment, ATOD utilizes a point in time balance allowing a partial amount up to a defined flat dollar threshold. In an alternate embodiment, a full amount of the CFA from the former employer can be utilized by the participating member. If ATOD is not configured for the participating member, then the system proceeds to step 1506. If the ATOD account exists, method 1500 proceeds to transition period 1508.

Step 1506 occurs if the employer has not setup or configured an ATOD for the participating member. In step 1506, a traditional rollover occurs during which the participating member could be subject to a blackout period until the rollover completes.

Transition period 1508 is the time period during which claims are processed utilizing the ATOD account. In an embodiment, transition period 1508 continues until the new CFA opens and the balances in the ATOD account and the CFA are reconciled. Transition period 1508 includes step 1510 and step 1512.

In step 1510, contribution processing component 408 may process any claims using the ATOD account. The ATOD account may continue to serve as linked CFAOD table 434 until such time that step 1512 determines that the new CFA is open, the transferred funds from the ATOD account have cleared, and the transaction backlog resolved.

In step 1514, transition period 1508 ends and the CFA and the ATOD account are reconciled. Appropriate amounts transfer between the accounts to cover any claims or expenses. In the unlikely event that an overage occurs, in an embodiment, the participating member will offset the imbalance with future payroll deductions or provide a lump sum contribution to make the account whole. In an alternate embodiment, the amount could be reported to the employer and added to the participating member's W2 as a taxable event.

In step 1516, TXN manager 414 may generate bank transactions based on the reconciliation of contributions performed within plan management system 400 and send the bank transactions to bank accounts system 500 to reconcile CFAs stored in bank database 508.

In step 1518, TXN manager 414 may generate card transactions based on the reconciliation of contributions performed within plan management system 400 and concurrently send the card transactions to card accounts system 600 to reconcile CFAs and the ATOD information stored in card database 608.

In step 1520, contribution processing component 408 may receive confirmation results of the transactions sent in steps 1516 and 1518. If errors were encountered, an error reconciliation process as described in FIG. 8 may be initiated. Method 1500 ends in step 1522.

Example Computer System

Figure 16:
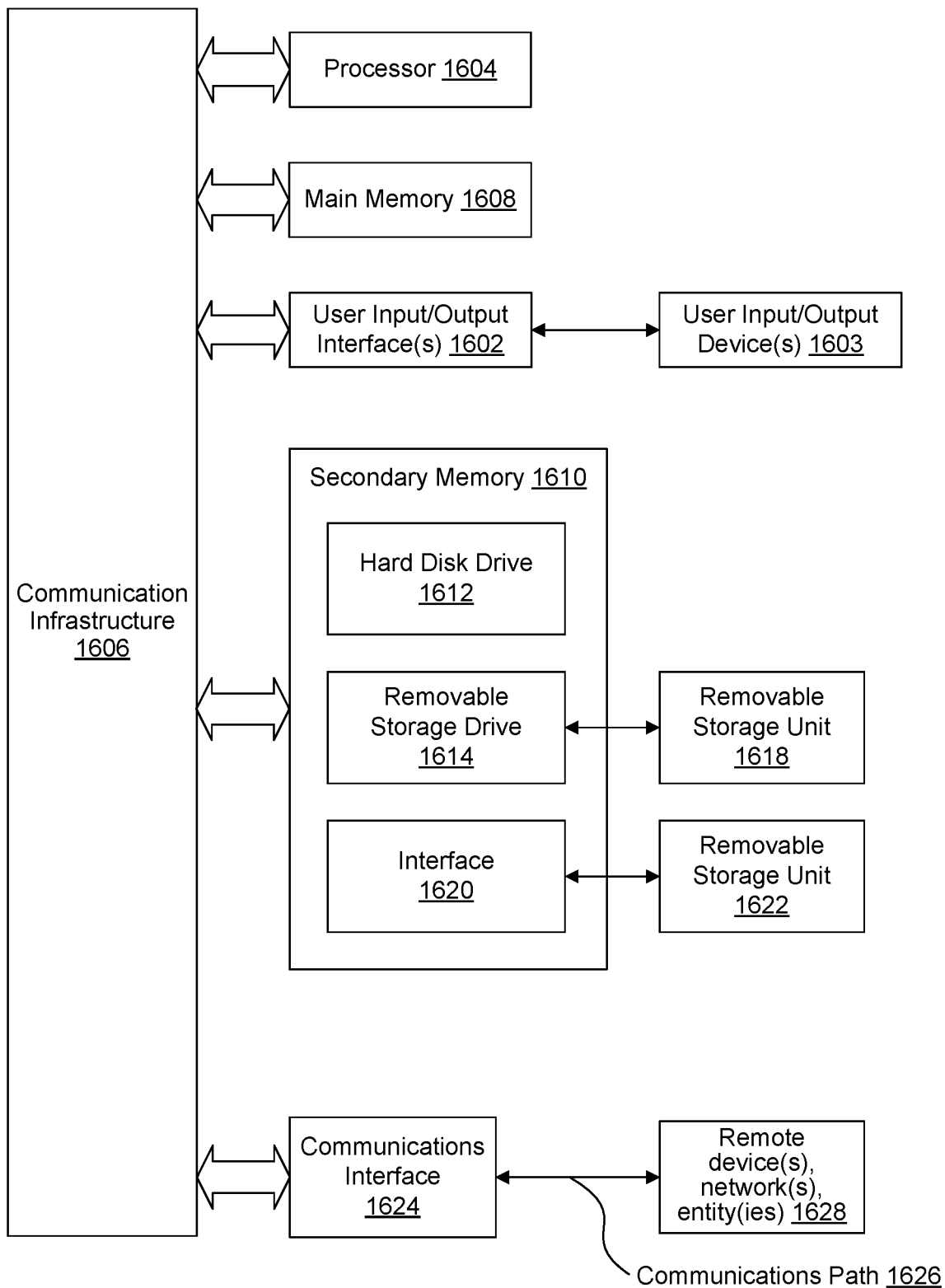
FIG. 16 is an example computer system useful for implementing various embodiments.

FIG. 16 is an example computer system that may be used to implement aspects of the systems illustrated in FIGS. 1-6, or which may be specially programmed to implement aspects of the processes illustrated in FIGS. 7-14. Computer system 1600 includes one or more processors (also called central processing units, or CPUs), such as a processor 1604. Processor 1604 is connected to a communication infrastructure or bus 1606.

One or more processors 1604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1600 also includes user input/output device(s) 1603, such as monitors, keyboards, pointing devices, etc., that communicate with communication infrastructure 1601 through user input/output interface(s) 1602.

Computer system 1600 also includes a main or primary memory 1608, such as random access memory (RAM). Main memory 1608 may include one or more levels of cache. Main memory 1608 has stored therein control logic (i.e., computer software) and/or data.

Computer system 1600 may also include one or more secondary storage devices or memory 1610. Secondary memory 1610 may include, for example, a hard disk drive 1612 and/or a removable storage device or drive 1614. Removable storage drive 1614 may be a floppy disk drive, a magnetic tape drive, a compact disk drive, an optical storage device, tape backup device, and/or any other storage device/drive.

Removable storage drive 1614 may interact with a removable storage unit 1618. Removable storage unit 1618 includes a computer usable or readable storage device having stored thereon computer software (control logic) and/or data. Removable storage unit 1618 may be a floppy disk, magnetic tape, compact disk, DVD, optical storage disk, and/ any other computer data storage device. Removable storage drive 1614 reads from and/or writes to removable storage unit 1618 in a well-known manner.

According to an example embodiment, secondary memory 1610 may include other means, instrumentalities or other approaches for allowing computer programs and/or other instructions and/or data to be accessed by computer system 1600. Such means, instrumentalities or other approaches may include, for example, a removable storage unit 1622 and an interface 1620. Examples of the removable storage unit 1622 and the interface 1620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1600 may further include a communication or network interface 1624. Communication interface 1624 enables computer system 1600 to communicate and interact with any combination of remote devices, remote networks, remote entities, etc. (individually and collectively referenced by reference number 1628). For example, communication interface 1624 may allow computer system 1600 to communicate with remote devices 1628 over communications path 1626, which may be wired and/or wireless, and which may include any combination of LANs, WANs, the Internet, etc. Control logic and/or data may be transmitted to and from computer system 1600 via communication path 1626.

In an embodiment, a tangible apparatus or article of manufacture comprising a tangible computer useable or readable medium having control logic (software) stored thereon is also referred to herein as a computer program product or program storage device. This includes, but is not limited to, computer system 1600, main memory 1608, secondary memory 1610, and removable storage units 1618 and 1622, as well as tangible articles of manufacture embodying any combination of the foregoing. Such control logic, when executed by one or more data processing devices (such as computer system 1600), causes such data processing devices to operate as described herein.

Based on the teachings contained in this disclosure, it will be apparent to persons skilled in the relevant art(s) how to make and use embodiments of the present disclosure using data processing devices, computer systems and/or computer architectures other than that shown in FIG. 16. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the present disclosure is not limited thereto. Other embodiments and modifications thereto are possible, and are within the scope and spirit of the present disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries may be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the present disclosure should not be limited by any of the above-described exemplary embodiments, but should be defined only in accordance with the following claims and their equivalents.

What is claimed is:

1. A system, comprising:
a memory; and
at least one processor coupled to the memory and configured to:
associate a linked contribution funded account (CFA) and an asset transfer on demand account (ATODA) with an employee in a management database, wherein the linked CFA comprises a balance and an on-demand balance, wherein the linked CFA is associated with a bank CFA, and wherein the ATODA comprises an amount available to the employee during a transition period and an amount borrowed;
receive a transfer notification from an employer server that indicates a new bank CFA;
in response to the transfer notification, process a claim made during the transition period using the ATODA by adding a cost associated with the claim to the amount borrowed and subtracting the cost associated with the claim to the amount available;
delay transfer reconciliation of the linked CFA with the new bank CFA until: (1) generating a first bank transaction and sending the first bank transaction to a bank server to enroll the employee in the new bank CFA, (2) receiving from the bank server, in response to the sending the first bank transaction, a bank CFA identifier and enrollment results, (3) generating a second bank transaction and sending the second bank transaction to the bank server to fund the new bank CFA with a transferred amount corresponding to the balance using the bank CFA identifier, and (4) receiving from the bank server, in response to the sending the second bank transaction, a settlement result indicating that no errors were received from the bank server; and
resolve the ATODA to end the transition period such that the linked CFA is associated with the new bank CFA, wherein the resolving generates a resolved balance and a resolved on-demand balance, wherein the resolved balance is the difference between the transferred amount and the amount borrowed; and
upon resolution of the ATODA, send one or more bank transactions regarding the resolved balance to a bank server configured to reconcile the new bank CFA with the linked CFA and concurrently send one or more card transactions regarding the resolved balance and the resolved on-demand balance to a card server configured to reconcile a card account comprising a card CFA with the linked CFA.

2. The system of claim 1, the at least one processor further configured to:
add a payback record to an employer funding request (EFR) when the amount available is reduced during the transition period, wherein the payback record indicates an amount corresponding to the amount borrowed, and send the EFR to the employer server.

3. The system of claim 1, the at least one processor further configured to:
store a transfer transaction in the management database indicating the transferred amount.

4. The system of claim 1, the at least one processor further configured to:
receive a bank reconciliation result from the bank server; and
if the bank reconciliation result indicates that the new bank CFA could not be reconciled with the linked CFA, determine an updated balance and an updated on-demand balance based on the bank reconciliation result, and
send information regarding the updated balance and the updated on-demand balance to the card server configured to reconcile the card account.

5. The system of claim 1, the at least one processor further configured to:
receive status information from the employer server indicating an updated status of the linked CFA, and in response to the received status information, send a multi-purse indicator to the card server, wherein the card server is configured to:
select a multi-purse table from a plurality of multi-purse tables using the received multi-purse indicator, wherein the multi-purse table comprises an ordered set of enabled accounts and qualified services associated with one or more accounts of the ordered set, and
process transactions of a card associated with the card account using the selected multi-purse table.

6. The system of claim 5, wherein the received status information indicates that the linked CFA is to be associated with an investment.

7. The system of claim 1, the at least one processor further configured to:
in response to the transfer notification, send an enrollment transaction to the new bank CFA to enroll the employee into the new bank CFA in accordance with the received transfer notification; and
in response to the enrollment transaction, receive enrollment results comprising a bank CFA identifier.

8. A method, comprising:
associating, by one or more processors, a linked contribution funded account (CFA) and an asset transfer on demand account (ATODA) with an employee in a management database, wherein the linked CFA comprises a balance and an on-demand balance, wherein the linked CFA is associated with a bank CFA, and wherein the ATODA comprises an amount available to the employee during a transition period and an amount borrowed;
receiving, by the one or more processors, a transfer notification from an employer server, wherein the transfer notification indicates a new bank CFA;
in response to the transfer notification, processing, by the one or more processors, a claim made during the transition period using the ATODA by adding a cost associated with the claim to the amount borrowed and subtracting the cost associated with the claim to the amount available;
delaying, by the one or more processors, transfer reconciliation of the linked CFA with the new bank CFA until: (1) generating a first bank transaction and sending the first bank transaction to a bank server to enroll the employee in the new bank CFA, (2) receiving from the bank server, in response to the sending the first bank transaction, a bank CFA identifier and enrollment results, (3) generating a second bank transaction and sending the second bank transaction to the bank server to fund the new bank CFA with a transferred amount corresponding to the balance using the bank CFA identifier, and (4) receiving from the bank server, in response to the sending the second bank transaction, a settlement result indicating that no errors were received from the bank server;

resolving, by the one or more processors, the ATODA to end the transition period such that the linked CFA is associated with the new bank CFA, wherein the resolving generates a resolved balance and a resolved on-demand balance, wherein the resolved balance is the difference between the transferred amount and the amount borrowed; and upon resolution of the ATODA, sending, by the one or more processors, one or more bank transactions regarding the resolved balance to a bank server configured to reconcile the new bank CFA with the linked CFA and concurrently sending one or more card transactions regarding the resolved balance and the resolved on-demand balance to a card server configured to reconcile a card account comprising a card CFA with the linked CFA.

9. The method of claim 8, further comprising:
adding, by the one or more processors, a payback record to an employer funding request (EFR) when the amount available is reduced during the transition period, wherein the payback record indicates an amount corresponding to the reduction to the amount borrowed; and
sending, by the one or more processors, the EFR to the employer server.

10. The method of claim 8, further comprising:
storing, by the one or more processors, a transfer transaction in the management database indicating the transferred amount.

11. The method of claim 8, further comprising:
receiving a bank reconciliation result from the bank server;
if the bank reconciliation result indicates that the new bank CFA could not be reconciled with the linked CFA, determining an updated balance and an updated on-demand balance based on the bank reconciliation result, and
sending information regarding the updated balance and the updated on-demand balance to the card server configured to reconcile the card account.

12. The method of claim 8, further comprising:
receiving status information from the employer server indicating an updated status of the linked CFA; and
upon receipt of the status information, sending a multi-purse indicator to the card server, wherein the card server is configured to:
 select a multi-purse table from a plurality of multi-purse tables using the received multi-purse indicator, wherein the multi-purse table comprises an ordered set of enabled accounts and qualified services associated with one or more accounts of the ordered set, and
 process transactions of a card associated with the card account using the selected multi-purse table.

13. The method of claim 12, wherein the received status information indicates that the linked CFA is to be associated with an investment.

14. The method of claim 8, further comprising:
in response to the transfer notification, sending, by the one or more processors, an enrollment transaction to the new bank CFA to enroll the employee into the new bank CFA in accordance with the received transfer notification; and in response to the enrollment transaction, receiving, by the one or more processors, enrollment results comprising a bank CFA identifier.

15. A non-transitory computer readable storage medium having instructions stored thereon that, in response to execution by a computing device, cause the computing device to perform operations comprising:
associating a linked contribution funded account (CFA) and an asset transfer on demand account (ATODA) with an employee in a management database, wherein the linked CFA comprises a balance and an on-demand balance, wherein the linked CFA is associated with a bank CFA, and wherein the ATODA comprises an amount available to the employee during a transition period and an amount borrowed;
receiving a transfer notification from an employer server, wherein the transfer notification indicates a new bank CFA;
in response to the transfer notification, processing a claim made during the transition period using the ATODA by adding a cost associated with the claim to the amount borrowed and subtracting the cost associated with the claim to the amount available;
delaying transfer reconciliation of the linked CFA with the new bank CFA until: (1) generating a first bank transaction and sending the first bank transaction to a bank server to enroll the employee in the new bank CFA, (2) receiving from the bank server, in response to the sending the first bank transaction, a bank CFA identifier and enrollment results, (3) generating a second bank transaction and sending the second bank transaction to the bank server to fund the new bank CFA with a transferred amount corresponding to the balance using the bank CFA identifier, and (4) receiving from the bank server, in response to the sending the second bank transaction, a settlement result indicating that no errors were received from the bank server;
resolving the ATODA to end the transition period such that the linked CFA is associated with the new bank CFA, wherein the resolving generates a resolved balance and a resolved on-demand balance, wherein the resolved balance is the difference between the transferred amount and the amount borrowed; and
upon resolution of the ATODA, sending one or more bank transactions regarding the resolved balance to a bank server configured to reconcile the new bank CFA with the linked CFA and concurrently sending one or more card transactions regarding the resolved balance and the resolved on-demand balance to a card server configured to reconcile a card account comprising a card CFA with the linked CFA.

16. The non-transitory computer readable storage medium of claim 15, the operations further comprising:
adding a payback record to an employer funding request (EFR) when the amount available is reduced during the transition period, wherein the payback record indicates an amount corresponding to the amount borrowed; and
sending the EFR to the employer server.

17. The non-transitory computer readable storage medium of claim 15, the operations further comprising:
storing a transfer transaction in the management database indicating the transferred amount.

18. The non-transitory computer readable storage medium of claim 15, the operations further comprising:
receiving a bank reconciliation result from the bank server; and if the bank reconciliation result indicates that the new bank CFA could not be reconciled with the linked CFA, determine an updated balance and an updated on-demand balance based on the bank reconciliation result, and sending information regarding the updated balance and updated on-demand balance to the card server configured to reconcile the card account.

19. The non-transitory computer readable storage medium of claim 15, the operations further comprising:
receiving status information from the employer server indicating an updated status of the linked CFA;
upon receipt of the status information, sending a multi-purse indicator to the card server, wherein the card server is configured to:
select a multi-purse table from a plurality of multi-purse tables using the received multi-purse indicator, wherein the multi-purse table comprises an ordered set of enabled accounts and qualified services associated with one or more accounts of the ordered set, and
process transactions of a card associated with the card account using the selected multi-purse table.

20. The non-transitory computer readable storage medium of claim 15, the operations further comprising:
in response to the transfer notification, sending an enrollment transaction to the new bank CFA to enroll the employee into the new bank CFA in accordance with the received transfer notification; and
in response to the enrollment transaction, receiving enrollment results comprising a bank CFA identifier.

* * * * *